United States Patent
Rizzo et al.

(10) Patent No.: US 7,400,625 B2
(45) Date of Patent: Jul. 15, 2008

(54) PROTOCOL FOR MULTICAST COMMUNICATION

(75) Inventors: Michael Rizzo, Ipswich (GB); Bob Briscoe, Woodbridge (GB)

(73) Assignee: British Telecommunications public limited company, London (GB)

( * ) Notice: Subject to any disclaimer, the term of this patent is extended or adjusted under 35 U.S.C. 154(b) by 980 days.

(21) Appl. No.: 10/276,996

(22) PCT Filed: Jun. 15, 2001

(86) PCT No.: PCT/GB01/02681

§ 371 (c)(1),
(2), (4) Date: Nov. 20, 2002

(87) PCT Pub. No.: WO01/99348

PCT Pub. Date: Dec. 27, 2001

(65) Prior Publication Data

US 2003/0147390 A1    Aug. 7, 2003

(30) Foreign Application Priority Data

Jun. 15, 2000    (GB)    ................... 0014662.1

(51) Int. Cl.
H04L 12/28    (2006.01)
H04M 3/42    (2006.01)
(52) U.S. Cl. ................... 370/392; 379/201.02
(58) Field of Classification Search ........... None
See application file for complete search history.

(56) References Cited

U.S. PATENT DOCUMENTS 6,115,600 A * 9/2000 Tuohino et al. ............. 455/405
6,370,143 B1 * 4/2002 Yamagishi ................... 370/390
6,778,653 B1 * 8/2004 Kallas et al. ............ 379/201.02
2002/0156798 A1 * 10/2002 Larue et al. ................. 707/201

FOREIGN PATENT DOCUMENTS

EP    0876029 A2    11/1998
WO    WO 99/65183    12/1999

OTHER PUBLICATIONS

European Telecommunication Standards Institute (ETSI), ETS 300 401, May 1997, Second Edition, pp. 117-120.

* cited by examiner

*Primary Examiner*—Huy D Vu
*Assistant Examiner*—Clemence Han
(74) *Attorney, Agent, or Firm*—Nixon & Vanderhye P.C.

(57) ABSTRACT

A data processing system method and software application program is provided for the efficient dissemination of information to multiple recipients over one or more communication channels in a communications network, for instance the multicast Internetwork. The method defines at least one primary data set for transmission over at least one primary communications channel in the network, where each primary data set includes data relating to at least one secondary data set associated therewith and provided for transmission over a secondary communications channel. The primary data set or sets are transmitted over primary communications channel(s) and at least one primary data set is modified in response to modifications to at least one secondary data set. The transmission step is repeated to provide potential recipient(s) of the primary data set or sets with an indication that at least one secondary data set has been modified independently of the recipient(s) receiving the modified secondary data set or sets.

15 Claims, 23 Drawing Sheets

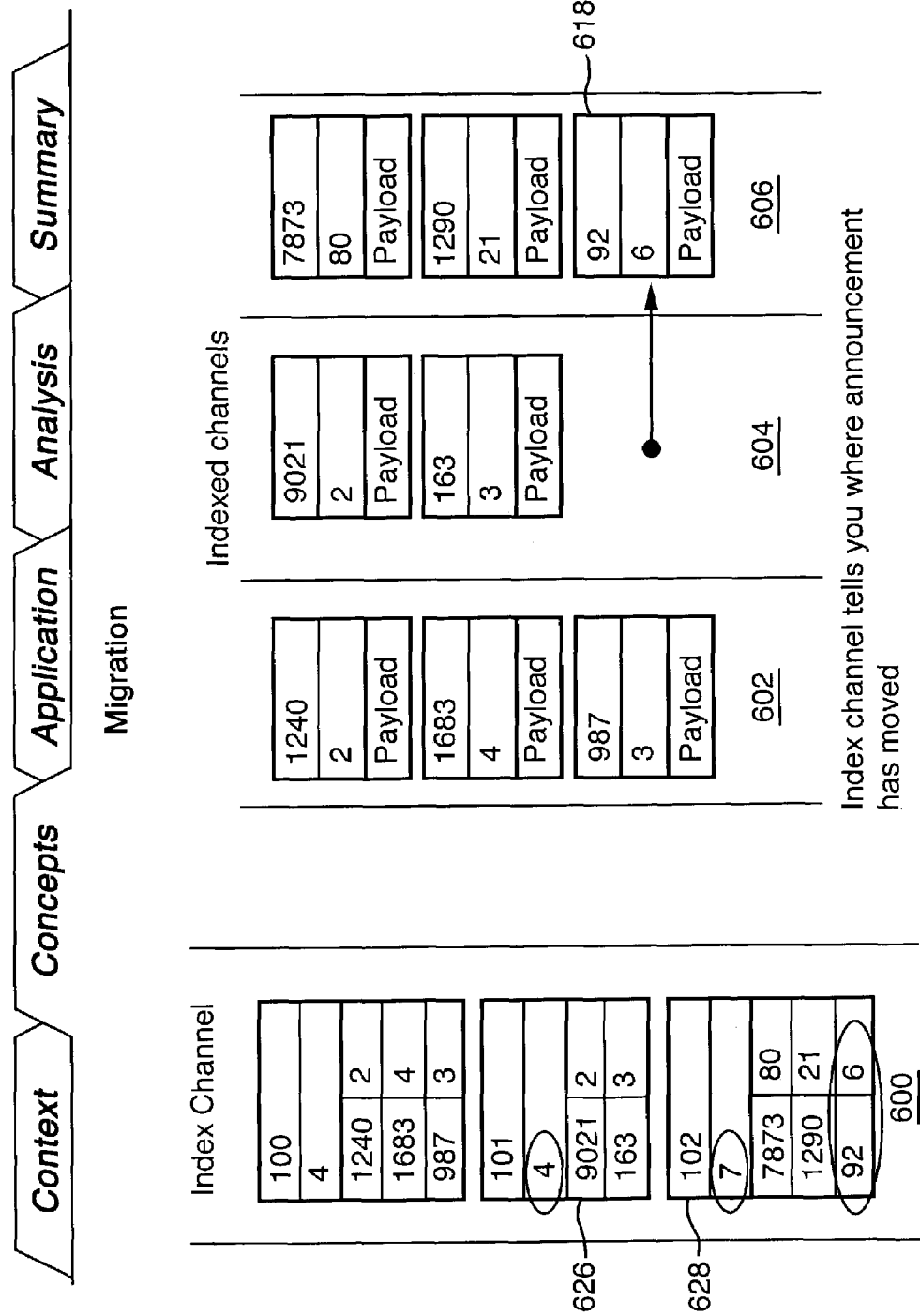

Announcer Console: Announcements

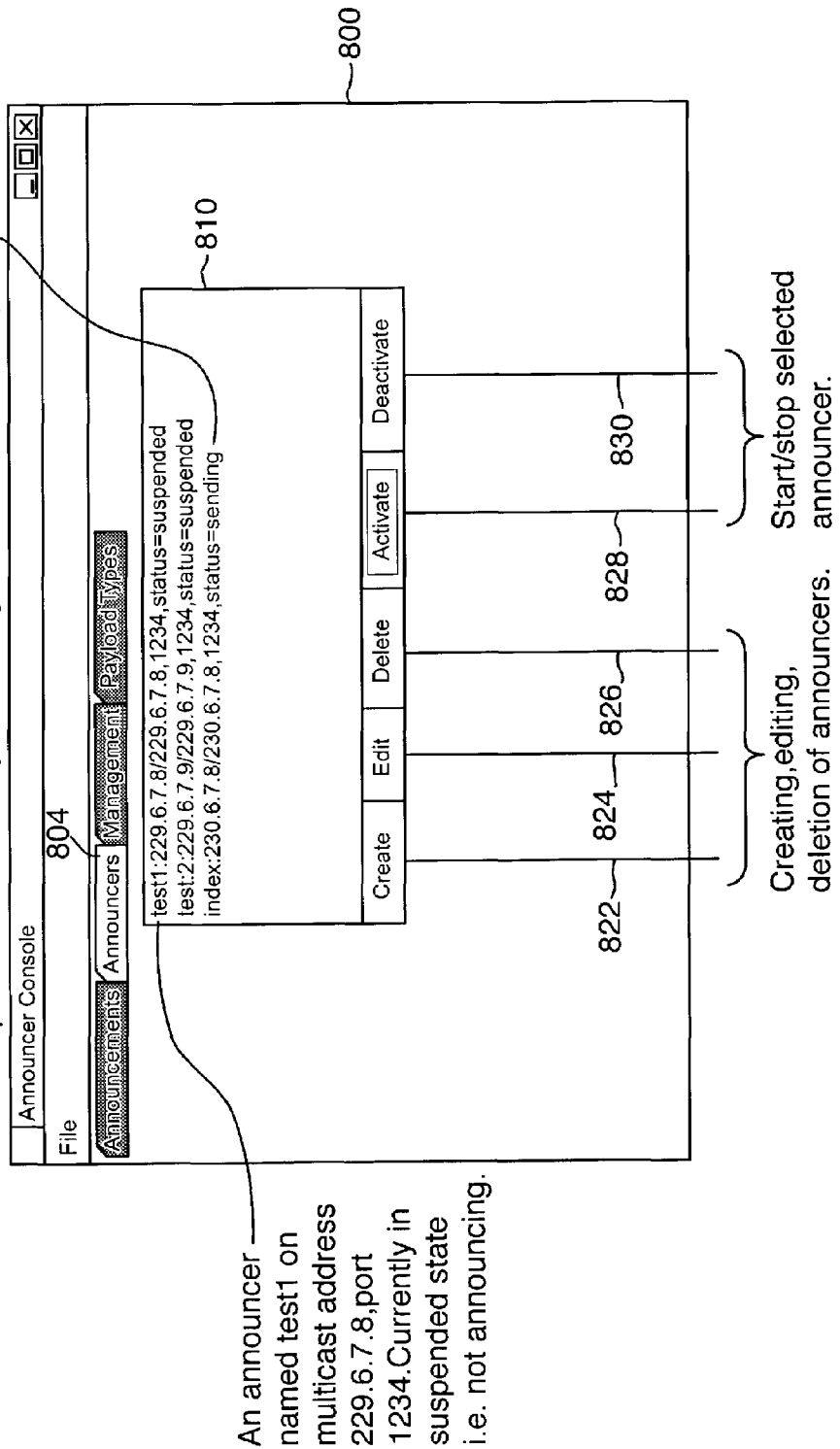

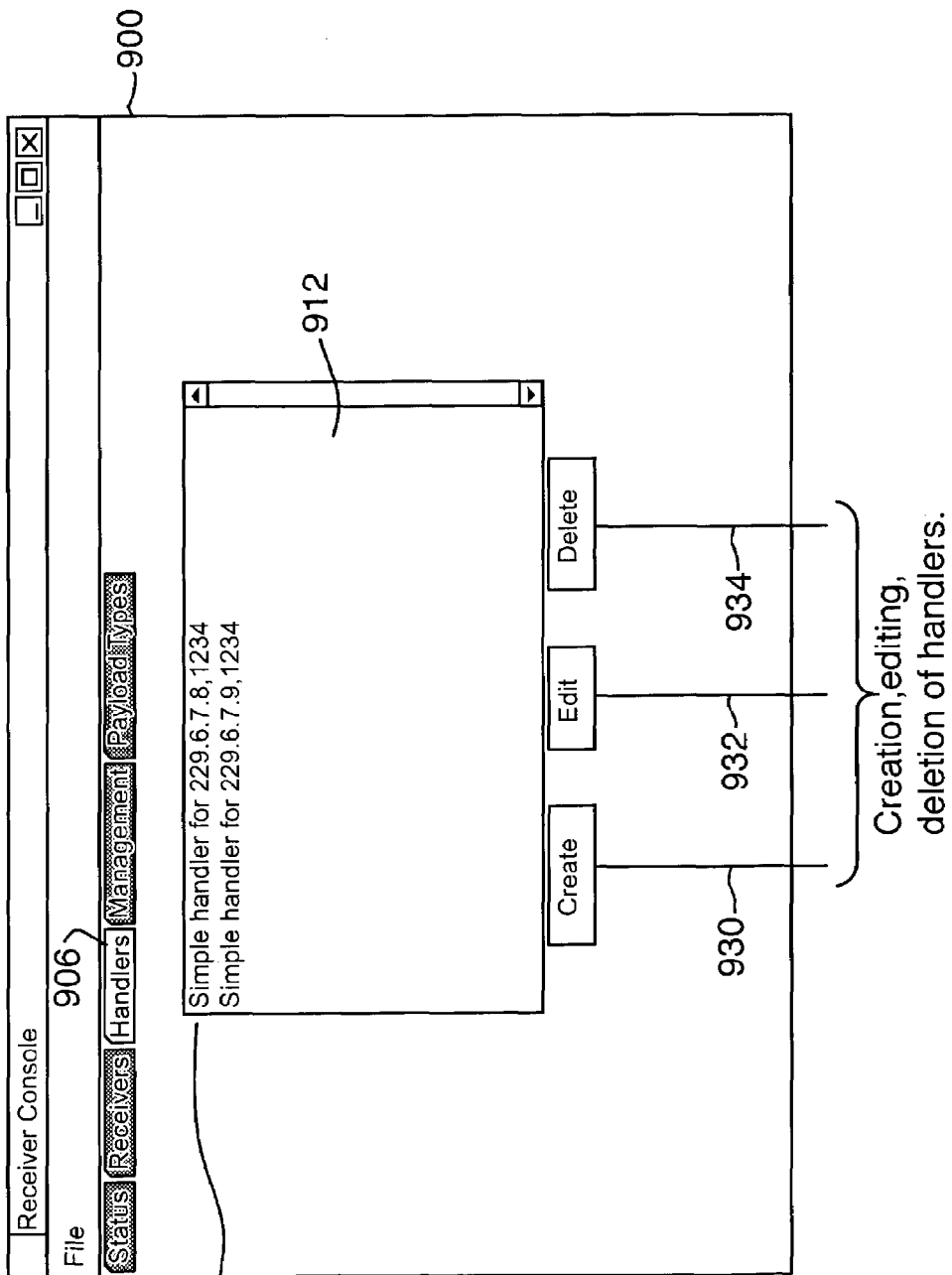

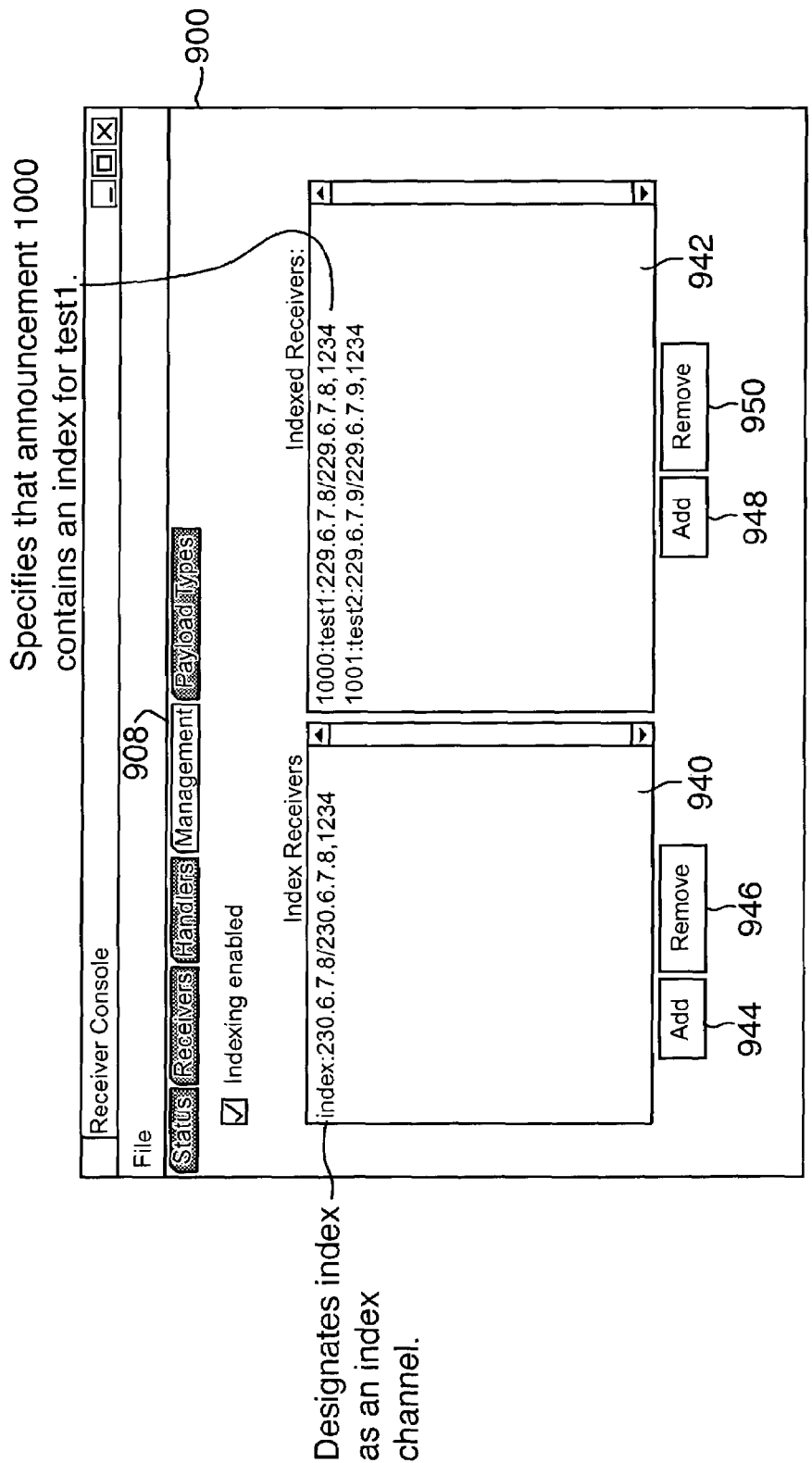

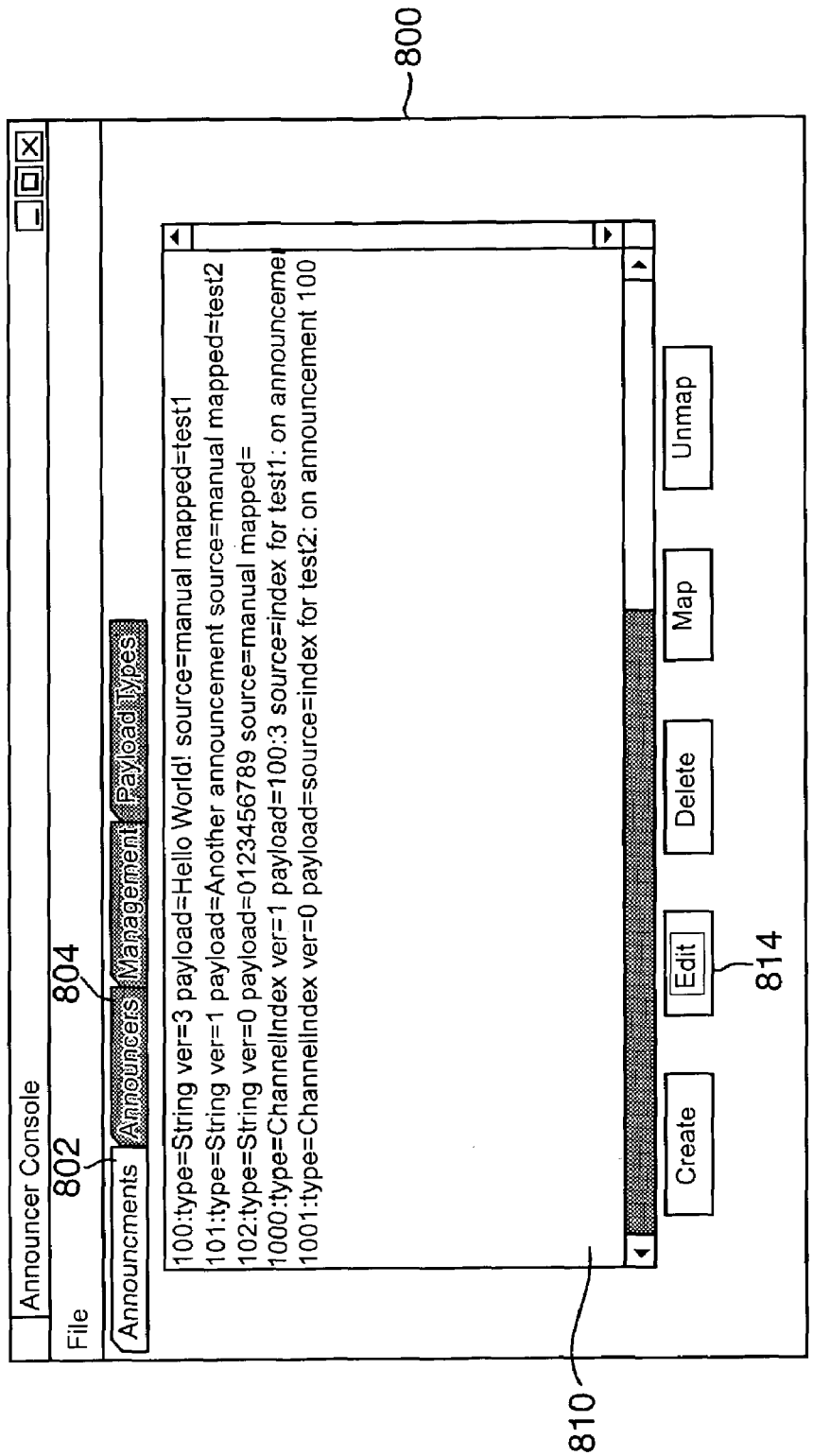

On the Announcer Console a dialog pops up to allow us to change the String payload.

On the Announcer Console we enter our new text and hit OK

On the Receiver Console initially we observe that the status of test1 is running-suspended On the Receiver Console but upon receiving the updated index for test1, the status for test1 becomes running-active (as the multicast group is joined)

On the Receiver Console and then switches back to running-suspended (as the multicast group is left) when the updated announcement 100 is received.

PROTOCOL FOR MULTICAST COMMUNICATION

This application is the U.S. national phase of international application PCT/GB01/02681 filed 15 Jun. 2001 which designated the U.S.

BACKGROUND

1. Technical Field

This invention relates to a communications transport protocol for transmitting data in a communications network and in particular to a method, data processing system and software application program for transmitting, receiving or transmitting and receiving data over a multicast enabled communications network.

2. Related Art

Traditional methods of information retrieval include the client/server request-response transaction model where a client sends a request to a server and waits for a reply. This model prescribes that clients should initiate requests and that servers should listen for requests and respond to them. This approach has the disadvantage that if an item of information requested by a client changes after the server has replied the change is only discovered if the client issues another request. The server is stateless, that is to say, it does not store information relating to the client, for example the information that was last sent to a client.

One approach taken to address the constraints of the client/server model for data transfer is the so called "push" server model. The "push" approach, found in services such as Microsoft's Active Channel for example, is not really a push model at all since a server by definition cannot push to a client. Instead the client is arranged automatically to poll the server for new data at pre-defined intervals using conventional client/server interactions and to pull down new data according to pre-determined selection criteria. The main disadvantage of the "push" model is that if the number of clients is large and the information changes frequently the server can be overwhelmed since a copy of the updated information must be transmitted separately to each client that requests it. The problem of replicating data transmissions is also relevant to the so called "stateful" server model where clients register with the server and are notified by the server when relevant information is updated.

The above approaches are based on unicast communications, typically using Transmission Control Protocol (TCP) across Internet Protocol (IP) networks to guarantee delivery.

Multicast transmissions are becoming increasingly common on the Internet. In contrast to standard Internet Protocol (IP) point to point transmissions (unicast), IP multicast allows the simultaneous transmission of information to a group of recipients from a single source. Routing support for IP multicast transmissions is provided by multicast enabled regular routers, or by general purpose computers with multicast routing-enabled that are linked to form the MBone (IP Multicast Backbone) which is a virtual network layered on top of the Internet.

Multicast provides another approach to data transfer. In this approach a multicast server transmits data over one or more multicast channels which one or more client receivers join or subscribe to. In this model the server only sends out one copy of the data irrespective of the number of client recipients listening to the appropriate multicast channel or channels. In IP multicast the server does not even need to know who the recipients are or the number of recipients in a particular multicast group.

IP multicast allows real-time communications over wide area IP networks and typical transmissions include video and audio conferencing, live multimedia training, university lectures, and transmission of live television and radio programmes, for example. IP multicast also allows more persistent data to be transmitted, including for instance media session descriptions comprising session oriented and user oriented data.

A multicast media session usually consists of one or more individual media streams typically carrying video, audio, whiteboard or raw data. Some sessions are persistent, but the majority exist for a specific period of time, although need not be continuous. Multicast based transmissions differ from unicast IP transmissions in that any user knowing about the transmission can join the session (unless the transmission is encrypted) and to receive a transmission, a user only needs to know the appropriate transmission group address and timing information for the session.

Prior to a multicast transmission an appropriate announcement containing a session description is made, usually at a well known IP multi-cast group address. Standard session descriptions are generated using Session Description Protocol (SDP), as defined in the Internet Engineering Task Force's draft RFC 2327. SDP is a simple ASCII text based protocol that is used to describe real time multimedia sessions and their related scheduling information. SDP messages are wrapped in a carrier protocol, known as a Session Announcement Protocol (SAP), which, in addition to containing the necessary IP addressing and routing information for transmission across the Internet or MBone, allows the SDP message to be encrypted, signed or compressed. An announcement can then be sent at regular intervals to the announcement group address which comprises a single IP multicast channel.

SAP is an IETF experimental standard and is currently used by the academic and research community to announce media session descriptions which are usually constructed in accordance with SDP. Despite the widespread use of SAP there are a number of drawbacks with the protocol. Firstly, a single well known IP multicast group address, otherwise known as a multicast channel, is assigned for SAP announcements. Thus, the announcement rate for SAP is relatively low with typically several minutes elapsing between repeated announcements. Moreover, although SAP will scale to any number of receivers it will not scale to more than say a few thousand announcements even with local receiver or proxy caching. Thus, while the use of a single well know multicast channel is well suited for the current small IP multicast user community it is a highly inappropriate model for use by the broader Internet user community. The advantage of using a single well known channel that every user can listen to is far outweighed by the bandwidth limitations of a single channel.

Hierarchical SAP ['Describing session directories in SDP' an IETF Internet Draft by Ross Finlayson] alleviates this problem, by simply allowing any of the media session descriptions on the single well-known channel to describe a secondary channel for announcing media descriptions. This can continue by creating further tertiary channels and announcing them on the secondary channels and so on. As long as the grouping of announcements on each sub-channel matches the interest of the listeners, this reduces waste of receiver bandwidth. However, because receivers interests never coincide to any great degree, considerable unnecessary traffic still has to be received by any receiver, and therefore has to be transported across intervening networks unnecessarily. Further, senders can only limit the bandwidth required to listen to any one channel. If a receiver has to listen to a number of channels to monitor all its interests, the bandwidth received may well be excessive. Also, although splitting up the channels improves the timeliness of announcement updates, they are still delayed by the need to allow other repeating announcements to intervene between any two announcements about the same item.

SAP announcements are restricted in size, typically to 576 bytes for global announcements or the size of one IP packet, to prevent network congestion and conform to the requirements of many IP hosts which have a maximum 512 byte payload. Further, SAP has been designed to support one instance of a very specific application, that is to say, a global directory for multimedia sessions. In this regard SAP assumes that the payload it carries is a session description, and in particular a session description constructed in accordance with SDP. Thus, data such as session id and timing information, which is useful for announcement deletion purposes, is hidden from the SAP header and is only available when the SDP payload is processed. Similarly, although the SAP header contains a "message id hash", which can be used to distinguish announcements, it is impossible to determine whether the receipt of a new value in this field indicates that a new announcement is being made or an existing announcement is being updated, that is without first parsing the SDP payload to obtain the session id.

BRIEF SUMMARY

According to a first aspect of the invention there is provided a method of transmitting data in a communications network, said method comprising the steps of:— i) defining at least one primary data set for transmission over a primary communications channel in a communications network; the or each primary data set comprising data relating to a secondary data set associated therewith and provided for transmission over a secondary communications channel;

ii) transmitting said primary data set or sets over said primary communications channel(s);

iii) modifying a primary data set in response to modifications to a secondary data set, whereby said modified primary data set or sets include an indication of said secondary data set or sets so modified;

iv) repeating step iii) to provide potential recipient(s) of said primary data set or sets with an indication that at least one secondary data set has been modified independently of said recipient(s) receiving the modified secondary data set or sets.

The secondary data set may itself be of the same format as a primary data set. Thus, a secondary data set may comprise data relating to a tertiary data set, and so on recursively.

In this way one or more secondary communication channels can be used for repeatedly (or otherwise) transmitting secondary data sets and one or more primary channels can be used for repeatedly transmitting primary data sets containing data relating to the secondary data sets, including data relating to modifications to secondary data sets. This method enables modification data relating to many secondary data sets to be included in a single primary data set, or in a group of primary data sets that are transmitted on the same channel, allowing potential recipients of the secondary data sets to monitor the state of the secondary data sets by listening to a single primary communications channel. The use of a single primary channel in this way obviates the requirement for potential recipients to listen to all the related secondary channels. Since the method allows many secondary channels to be used for transmitting secondary data sets, transmission repetition periods on the secondary channels can be minimised.

The method readily permits groups of secondary data set to be managed using a single primary data set and groups of secondary communication channels to be managed using a single primary channel.

Preferably, said method further comprises the steps of the authority responsible for modifying the primary data set to be receiving at least one secondary data set over said secondary communications channel or channels and processing said at least one secondary data set to determine whether said at least one secondary data set has been modified. This de-couples the process of modifying the secondary data sets from the process of modifying the primary data sets and readily permits a single authority to be responsible for modifying primary data sets in response to receiving modified secondary data sets. The use of a single authority provides for the efficient allocation and use of the primary communication channels for data set transmission.

In preferred embodiments, each data set comprises a data set identifier, a current edition parameter, and a data payload, wherein the data payload of the or each primary data set comprises the data set identifier and the current edition parameter of the or each associated secondary data set. Data set identifiers readily provide a means for uniquely identifying primary and secondary data sets and identifying relationships between primary and secondary data sets. The current edition parameter readily provides a means for identifying data set state and hence a means for determining whether the data set has been modified since it was last received. In addition, the data set identifiers and current edition parameters readily provide a means for filtering received data sets according to pre-determined selection criteria.

Conveniently, said current edition parameter for the or each secondary data set is modified in response to changes to said secondary data set payload data, thereby to provide recipients of the or each primary data set with an indication of the identity of the or each modified secondary data set. This readily provides for identification of modified secondary data sets from data contained in primary data sets.

Preferably, the or each current edition parameter is provided with an initial value and wherein the value of said parameter is incremented in response to the data set payload data being modified. Thus, data set state information can be readily determined from the value of current edition parameters.

In preferred embodiments, the or each primary data set is associated with a set of secondary data sets and the current edition parameter of the or each primary data set is incremented in response to the deletion or addition of at least one secondary data set from the association, as well as in-response to the update of any of the secondary edition parameters. In this way, changes to secondary data set index associations can be readily represented in primary data sets so that recipients of the primary data sets are provided with an indication of changes to the indexing structure. In this way potential recipients of secondary data sets can readily monitor the respective index associations by listening to an associated primary channel.

Conveniently, at least one secondary data set comprises payload data including at least network connection data for respective primary or secondary communication channels. In this way connection data can be readily transmitted to said potential recipients over said network. Further, changes to the network connections can be readily identified from said respective secondary data set payload data.

Preferably, at least one secondary data set comprises at least a description of a media session to be transmitted over said network. In this way a plurality of media session descriptions can be readily transmitted over a plurality of secondary communication channels to said potential recipients and a single respective primary communications channel can be used to identify changes to the media sessions. This can reduce the repetition cycle time for media session descriptions when transmitted over a network and also the data processing capacity required at the receiver end.

In preferred embodiments, at least one secondary data set comprises at least tariffing parameters for calculating the charge for network usage. In this way network users can listen to a single primary communication channel to identify changes to tariffing parameters for respective services as the new parameters are activated and potentially in advance thereof.

Preferably, said communications channels are multicast network channels and each data set is transmitted preferably repeatedly and possibly continuously on a multicast channel. This optimises the above mentioned advantages.

Conveniently, said method further comprises the step of allocating each of said data sets to one or more multicast channels.

According to a second aspect of the invention there is provided a software application program for processing data for transmission over a communications network; wherein said program is arranged to:— define at least one primary data set for transmission over at least one primary communications channel in a communications network; the or each primary data set comprising data relating to at least one secondary data set associated therewith and provided for transmission over a secondary communications channel;

transmit said primary data set or sets over said primary communications channel(s);

modify at least one primary data set in response to modifications to at least one secondary data set; and, repeat step iii) to provide potential recipient(s) of said primary data set or sets with an indication that at least one secondary data set has been modified independently of said recipient(s) receiving the modified secondary data set or sets.

Thus the above mentioned method may be implemented in a software application program and executed on suitable hardware.

According to another aspect of the invention there is provided a method of accessing data transmitted over a communications network; said method comprising the steps of:— i) receiving at least one primary data set transmitted over a primary communications channel in a communications network, the or each primary data set comprising data relating to at least one secondary data set associated therewith and provided for transmission over a secondary communication channel;

ii) processing the or each primary data set to determine whether said data set or sets indicate changes to said secondary data set or sets;

iii) joining the secondary channel to receive said secondary data set or sets over said secondary communications channel or channels in response to changes to said secondary data set or sets being detected.

iv) leaving the secondary channel once the secondary data set of interest has been received in full, thus avoiding further consumption of unnecessary bandwidth receiving other data sets on the communications channel According to a further aspect of the invention there is provided a software application program for processing data for transmission over a communications network; wherein said program is arranged to:— receive at least one primary data set transmitted over a primary communications channel in a communications network, the or each primary data set comprising data relating to at least one secondary data set associated therewith and provided for transmission over a secondary communication channel;

process the or each primary data set to determine whether said data set or sets indicate changes to said secondary data set or sets;

join the secondary channel to receive said secondary data set or sets over said secondary communications channel or channels in response to changes to said secondary data set or sets being detected.

BRIEF DESCRIPTION OF THE DRAWINGS

The invention will now be described, by way or example only, with reference to the accompanying drawings, in which:—

FIG. 6c is a schematic representation similar to FIG. 6a showing how potential recipients of the data sets may be alerted to changes to data set index associations;

FIG. 8b shows the GUI of FIG. 8a including data relating to multicast announcement channels;

FIG. 9c shows the GUI of FIG. 9a including data relating to data set payload handlers for multicast channels;

FIG. 9d shows the GUI of FIG. 9a including data relating to multicast index channels;

FIGS. 10a-10f show a sequence of events on the GUI's of FIGS. 8a-c and FIGS. 9a-d involving an announcement being edited and re-transmitted over a communications network.

DETAILED DESCRIPTION OF EXEMPLARY EMBODIMENTS

Figure 1:
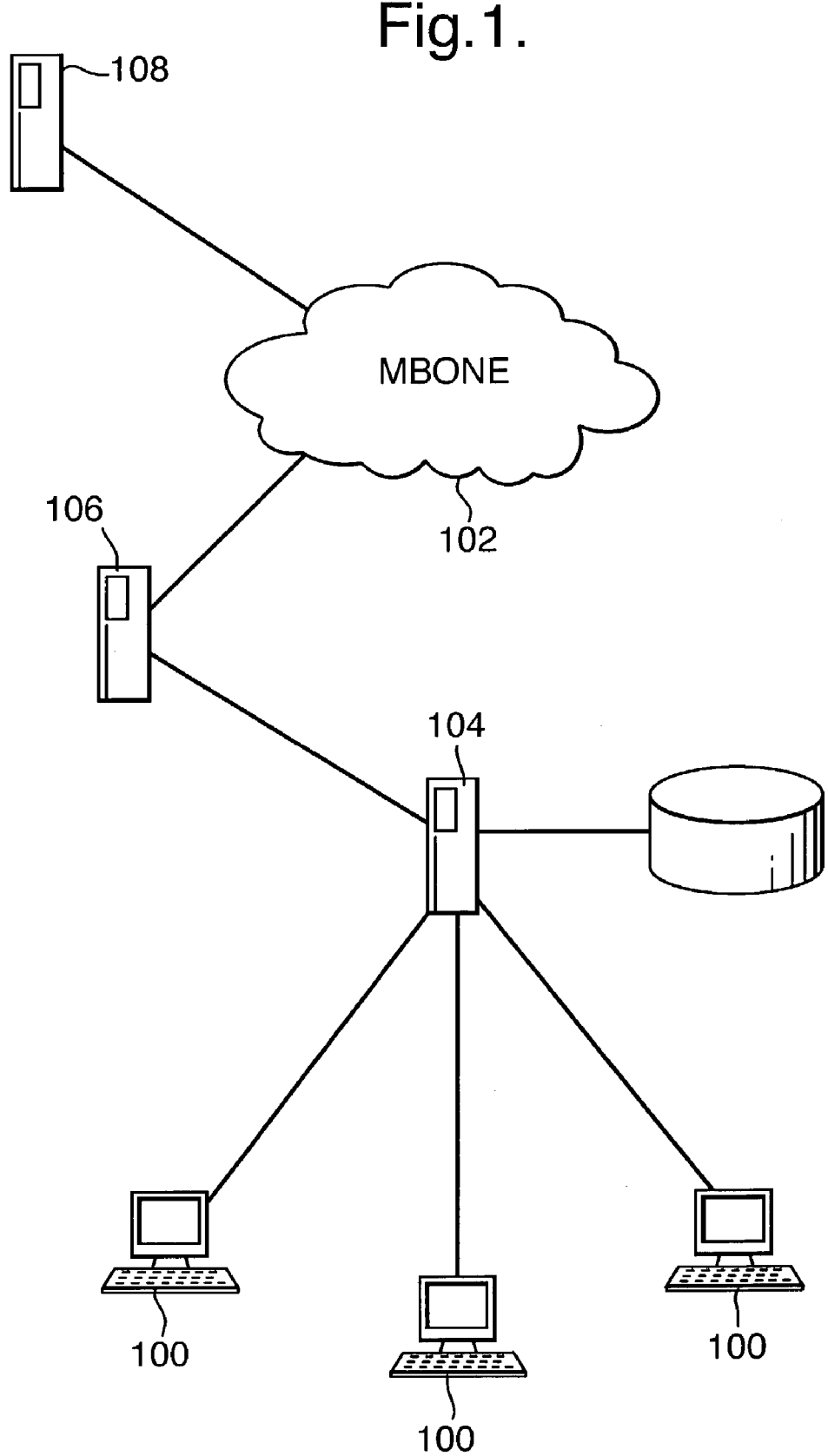
FIG. 1 is a schematic representation of the multicast Internetwork.

An example of an IP multicast transmission system used in one arrangement of the invention is described with reference to FIG. 1. In FIG. 1 a plurality of user terminals 100 are connected to the Internet multicast network 102 via Internet access servers 104 which are each connected to a multicast capable router 106, that is to say the servers 104 are each multicast enabled routers.

Multicast transmissions are made on the multicast network 102 using IP multicast group addresses. Access servers that elect to receive multicast transmissions join the appropriate IP multicast group address, or multicast channel, for that transmission. The concept of joining an IP group address is roughly analogous to that of a television or radio receiver being tuned to a particular frequency or "channel" to receive a television or radio broadcast on that channel.

In one arrangement, each user terminal that elects or is elected to receive a transmission is linked to the appropriate IP multicast group address for that transmission and the routers associated with the elected terminals are configured to receive multicast packets addressed to that group address. Data is then transmitted from one or more announcement sources 108 to the terminals of the multicast group.

Figure 2:
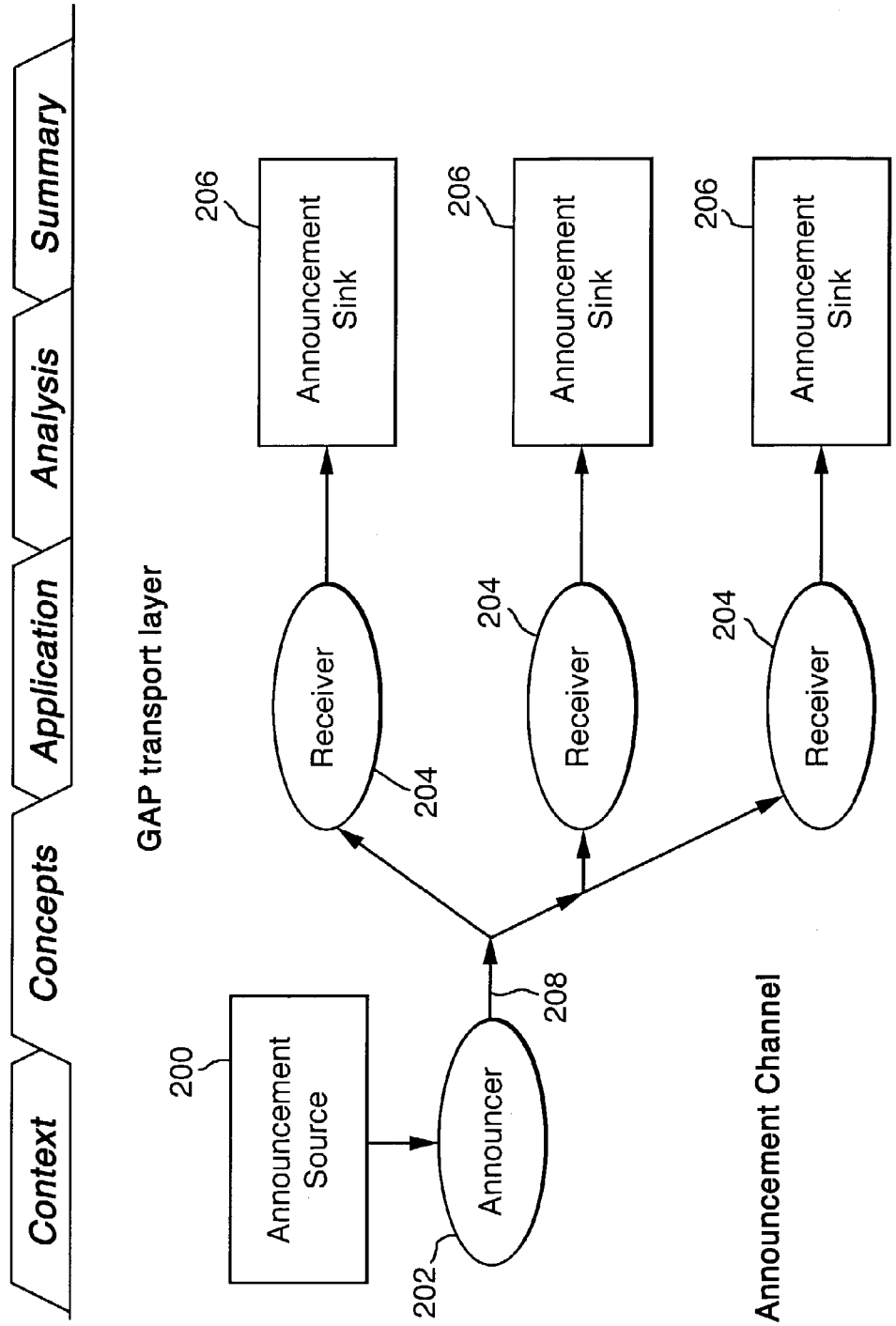
FIG. 2 is a schematic representation of the transport layer components of one arrangement for the invention.

Referring now to FIG. 2 which shows the transport layer components of one arrangement of the invention for use in the network of FIG. 1. In this arrangement data is transmitted from a data or announcement source 200 to an announcer 202 which selects an appropriate multicast channel 208 for the data to be transmitted on. A plurality of multicast data receivers 204 are provided at various network nodes for receiving the multicast data transmitted on the selected multicast channel. A data or announcement sink 206 is associated with each of the receivers where the multicast data may be processed on receipt. The components 200, 202, 204 and 206 may be positioned anywhere in a communications network but typically the receivers 204 and sinks 206 are positioned at network end points provided by the user terminals 100 and the source 200 and announcer 202 at an appropriate end point 108 comprising a multicast announcement server.

Figure 3:
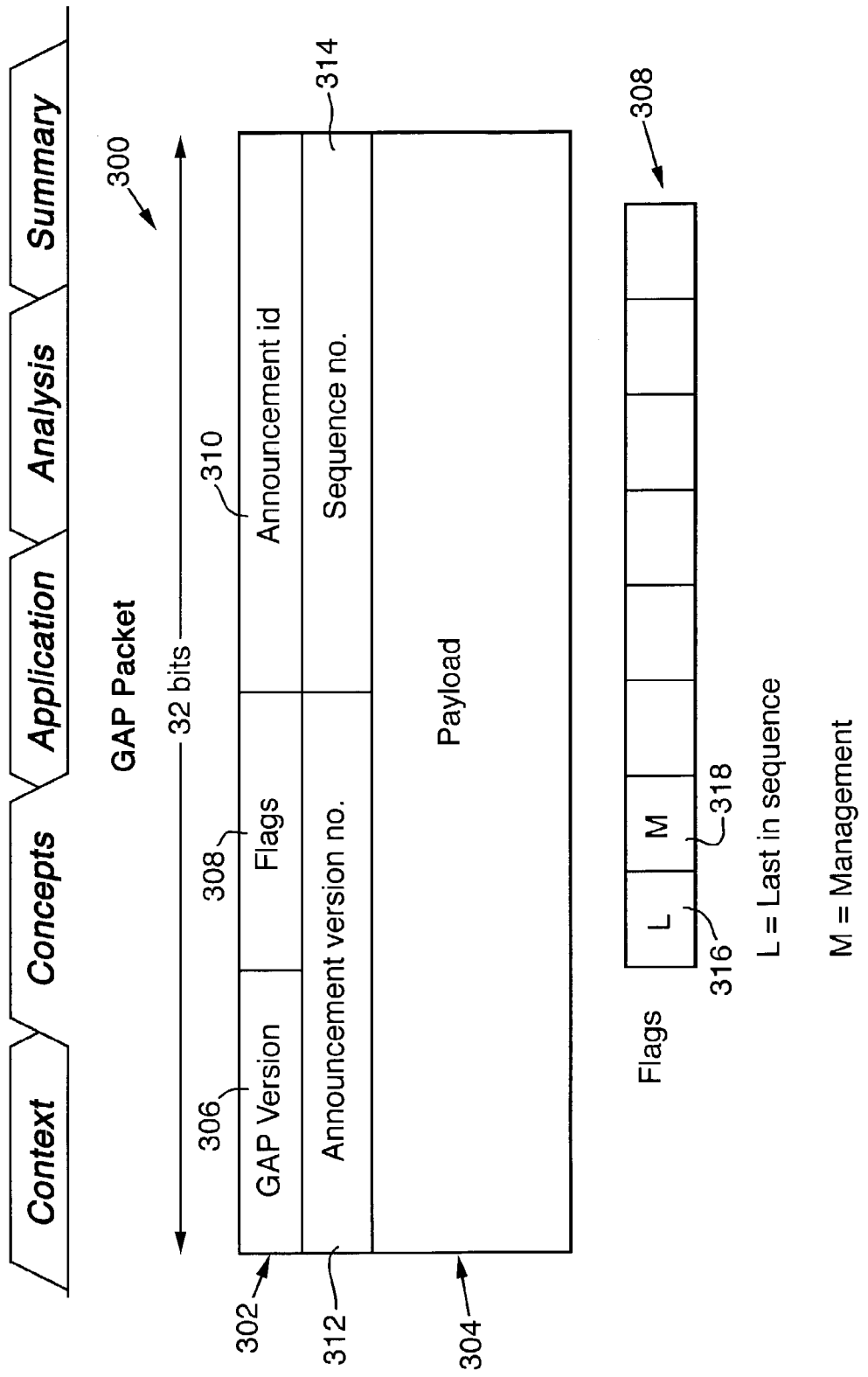
FIG. 3 is a graphical view of a data structure for transmitting data in the network of FIG. 1.

A typical data structure for transmitting data over an IP multicast network according to one arrangement of the invention is shown in FIG. 3. The data structure 300 comprises a header portion 302 and a data payload portion 304. The header portion comprises a first data field 306 of length 16 bits for storing a protocol version number, a second data field 308 of length 16 bits for storing 16×1 bit data flags, a third data field 310 of length 16 bits for storing a unique announcement identification parameter or number, a fourth data field 312 of length 16 bits for storing a announcement identification version or current edition number and a fifth data field 314 of length 16 bits for storing an IP packet sequence number. The second data field 308 comprises a first flag 316 for indicating whether the packet is the last in a sequence of packets, and a second flag 318 for indicating whether the packet is for a management channel. The concept of management channels is explained later in the description. The data payload portion 304 has a maximum size of 32 Megabytes, equal to 65536× 512 bytes. This limit is imposed by the sequence number field in FIG. 3. If this field were bigger, the limit would be bigger. Of course, it is possible to wrap round the sequence to transmit packets larger than the limit, as long as the last packet is sent considerably more than a round trip time after the first packet. The payload portion is untyped.

Figure 4:
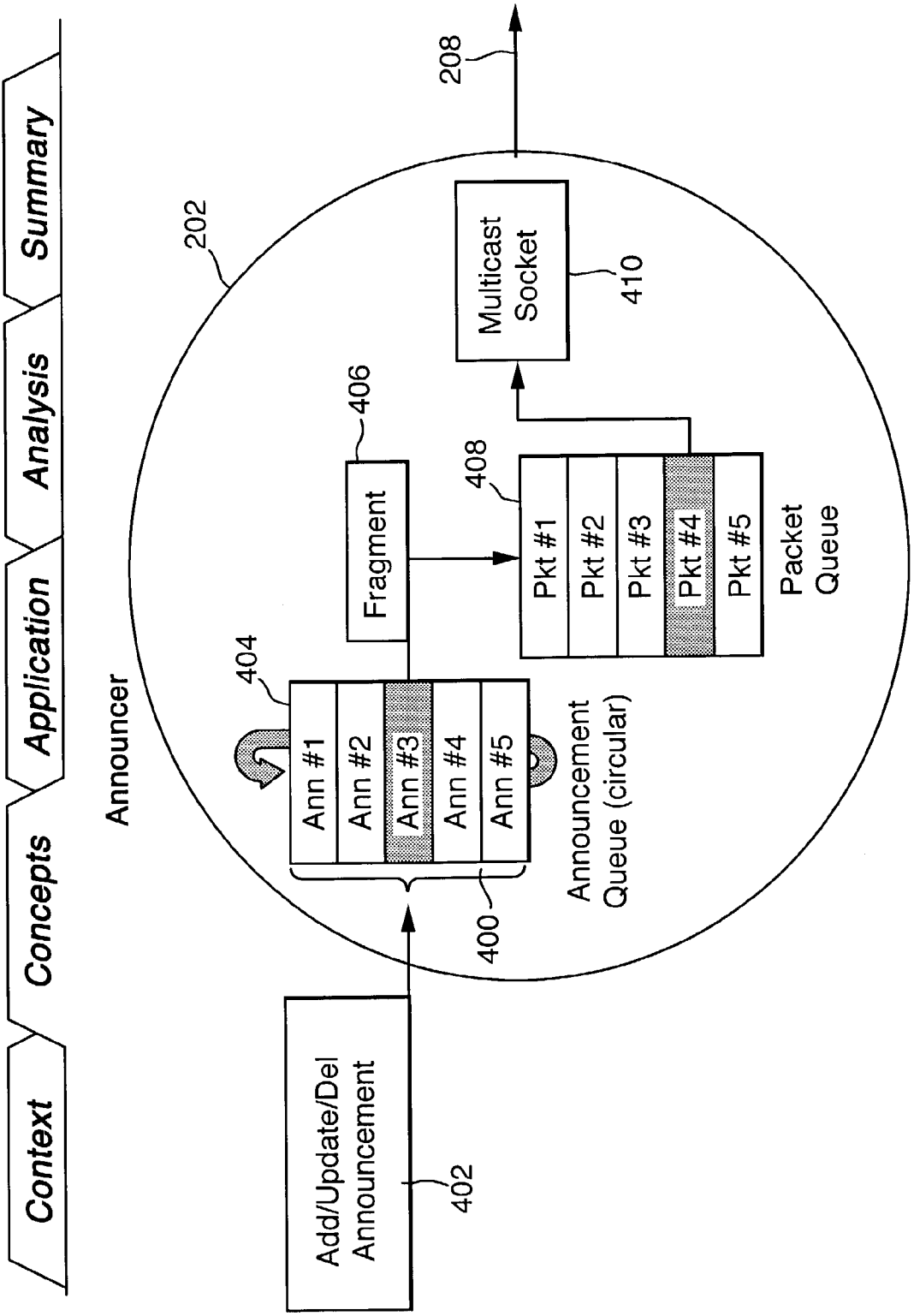
FIG. 4 is a schematic representation of an announcer for transmitting data in the network of FIG. 1.

With reference now to FIG. 4, the announcer 202 comprises an announcement interface 400 for receiving announcements constructed in accordance with the data structure of FIG. 3 from an application layer program 402 comprising an algorithm arranged to construct appropriate multicast announcements for transmission over multicast channels. The announcer further comprises an announcement cache 404 in which the received announcements are stored in a rotating queue for repeated periodic transmission, a fragmenter 406 for fragmenting or decomposing oversized announcements into one or more IP sized packets, a packet queue 408 for storing the IP packets prior to transmission and an IP multicast socket 410 for transmitting the packets on the appropriate multicast channels. The announcer may alternatively be arranged to repeat an announcement a predetermined number of times before deleting the announcement internally.

The application program 402 is used to construct a new announcement, update an existing announcement or delete an existing announcement. Each new multicast announcement is provided with a unique announcement identification number and stored in the identification number field 310. Identification numbers may be generated manually by users of the application program 402 or automatically by a routine within the program, for instance on a next available number basis. In a single sender environment identification numbers will uniquely identify announcements, however, in multi-sender environments identification number duplication will be possible since the senders IP address, from the IP packet header, can be additionally used to uniquely identify an announcement. Where an announcement is too large for a single IP packet, the announcement is decomposed by the fragmenter 406 into a series of sequenced IP packets. A sequence number is allocated to each of the packets and stored in the sequence number field 314 of the announcement so that the announcement can be reassembled on receipt of the sequenced packets in a manner similar to that used in TCP.

If an announcement is updated, by modification of the payload data, the announcement version number contained in the header field 312 is incremented, that is to say the version number for the announcement is increased by one. Announcements are edited at the application layer by means of the application program and sent to the announcer 202 with the incremented version number. A more detailed description of this process is provided later in the description.

Further, if an announcement is to be deleted from a multicast channel an appropriate control message is sent from the application program to the announcer 202 and the announcer removes the deleted announcement from the cache 404 to prevent further re-transmission. As noted above, the announcer may alternatively be arranged to automatically delete the announcement internally once it has been repeated a predetermined number of times.

Figure 5:
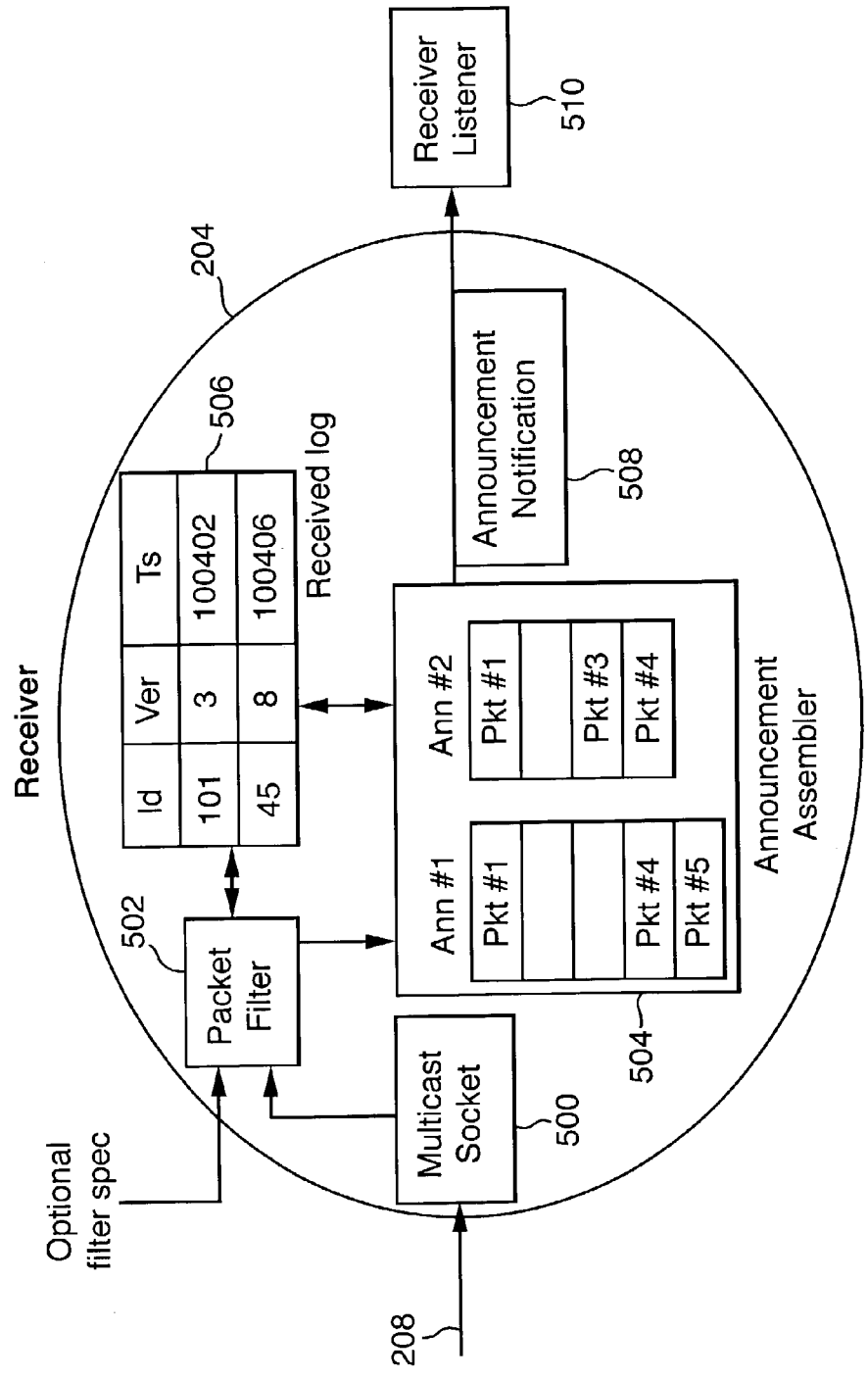
FIG. 5 is a schematic representation of a receiver for receiving data transmitted over the network of FIG. 1.

With reference now to FIG. 5, each receiver 204 comprises a multicast socket 500 for listening to and receiving announcements over designated multicast channels, an announcement filter 502 for filtering received IP packets comprising multicast announcements, an announcement assembler 504 for reassembling sequenced packets which comprise fragmented announcements, a memory 506 for storing information relating to received announcements including announcement identification and version numbers and the time and date of last receipt, and an announcement interface 508 for transmitting received announcements to an application layer program 510 comprising an algorithm arranged to process the announcements for presentation to or use by an end user. In the context of the present invention it is to be understood that the term "end user" comprises not only human operators but also the terminals themselves and any system or program that is configured to process announcement data in any way.

In use, the multicast socket 500 listens to one or more IP multicast channels that are of interest to the end user. On receipt of a packet or packets the socket becomes active and passes each packet it receives to the filter 502 which selects announcement packets for further processing according to pre-defined selection criteria, including for example, the announcement identification number or the senders IP address contained within the received packet. In this way filter parameters can be specified by end users so that only announcements that are of interest to the end user are passed to the announcement assembler 504 for processing. For instance, an end user may only be interested in receiving a sub set of announcements that are transmitted on a particular multicast channel or announcements that originate from specific senders.

Once the received packets are assembled by the announcement assembler the announcement identification number and version number is recorded in an event log file in memory 506 together with the time and date of receipt. By comparing the existing event log data with the announcement and version number of each newly received announcement the receiver can identify the announcement as either: 1) a new announcement; 2) a new version of previously received announcement; or, 3) an existing version of a previously received announcement. The receiver only transmits those announcements to the application program 510 in the aforementioned first and second categories. Those announcements that fall in the third category are processed by the receiver so that the time of receipt is recorded in the event log. In this way the application program 510 may send a query to the receiver to determine when a particular version of an announcement was last received, that is to say to determine how "fresh" the current version of an announcement is. The application program 510 may infer that an announcement has been deleted if the time elapsed since last receipt is inconsistent with that expected by the program based on historical data for the multicast channel. This is an alternative technique to monitoring removals of announcement from the index in order to detect removals of announcements. The above described transport layer arrangement does not provide guaranteed service, since the delivery of packets can not be readily acknowledged in a multicast environment. However, packet loss recovery is possible within an acceptable period. If a receiver fails to receive a packet it simply waits for the packet to be re-transmitted on the next announcement cycle. In the event that a dropped packet forms part of a larger announcement, the receiver only needs to wait for that packet to be retransmitted. It is not necessary for all the packets comprising the announcement to be processed by the receiver, that is of course unless the version number changes between transmission cycles. Since it is highly unlikely that the same packet will dropped twice in succession, that is on successive transmissions, there is a high probability that delivery will be successful after two transmission cycles. If the available network capacity remains more or less constant the probability increases with each additional transmission cycle. The above described transport layer protocol may therefore be described as "high probability of eventual delivery".

Exemplary Java code for software implementation of the announcer 202 and receiver 204 is provided below:

```
Announcer:
InetAddress ia = InetAddress.getByName ("229.5.6.7");
Announcer announcer = new Announcer (ia, 5678, 100);
announcer.addAnnouncement (new Announcement (
    1, 1, "Hello World".getBytes ( )
));
announcer.start ( );Thread.sleep (1000);
announcer.add (new Announcement (
    2, 1, "QoteS IV: The tariff strikes back".getBytes ( )
));
announcer.update (new Announcement (
    1, 2, "Hello World II".getBytes ( )
);
        Receiver:
InetAddress ia = InetAddress.getByName("229.5.6.7");
Receiver receiver = new Receiver (ia, 5678);
receiver.addReceiverListener (new ReceiverListener ( ) {
    public void announcementReceived(Announcement a) {
        System.out.println("ID: " + a.getId ( ) +
            "Serial: " + a.getSerialNo ( ) +
            "Payload: " + new String (a.getPayload ( ))
        );
    }});
receiver, start ( );
```

In one example, the payload field 304 comprises data defining a media session description constructed in accordance with the Session Description Protocol. Since the data structure of FIG. 3 provides an announcement identification number a version number field in the header portion it is possible to filter session descriptions announced using the above described transport layer protocol according to pre-defined selection criteria; independently of processing the SDP description containing the announcement identification number. The selection criteria may include for instance, the announcement identification and version number parameters contained in the message header portion 302. This provides significant advantages when compared with existing multicast transport protocols, notably SAP, used for announcing session descriptions. As previously mentioned, SAP does not contain an announcement identification parameter in the header portion, only a "message hash id". Thus whenever a SAP packet with a new "message hash id" is received, the SDP payload must be parsed in order to determine whether the announcements is for a new session, or a modification to an existing session. The data structure of FIG. 3 clearly separates the payload from the transport data in the header fields. In this way the receiver can discard unwanted announcements without first having to parse the payload. Further, since the data structure provides for multi-packet announcements using the sequence number field, session descriptions can be significantly larger. As mentioned, SAP announcements are restricted to the size of one packet and even when an announcement fits into a single packet there remains the possibility of fragmentation at the link layer, that is if the IP packet size exceeds the link layer protocol's maximum segment size (MSS). If one link layer fragment is lost the whole announcement is lost and the receiver must receive all fragments again. With the above described transport protocol several packets could be used so that none of the IP packets exceed the maximum segment size of the relevant link layer protocol.

The above described transport protocol enables multiple multicast channels to be used for transmitting data to many recipients in a controlled and efficient manner. In fact, the more data sets any one receiver is interested in, the more efficient the protocol becomes, as the constant resource cost of listening to the index announcement is amortised over more and more uses.

Figure 6A:
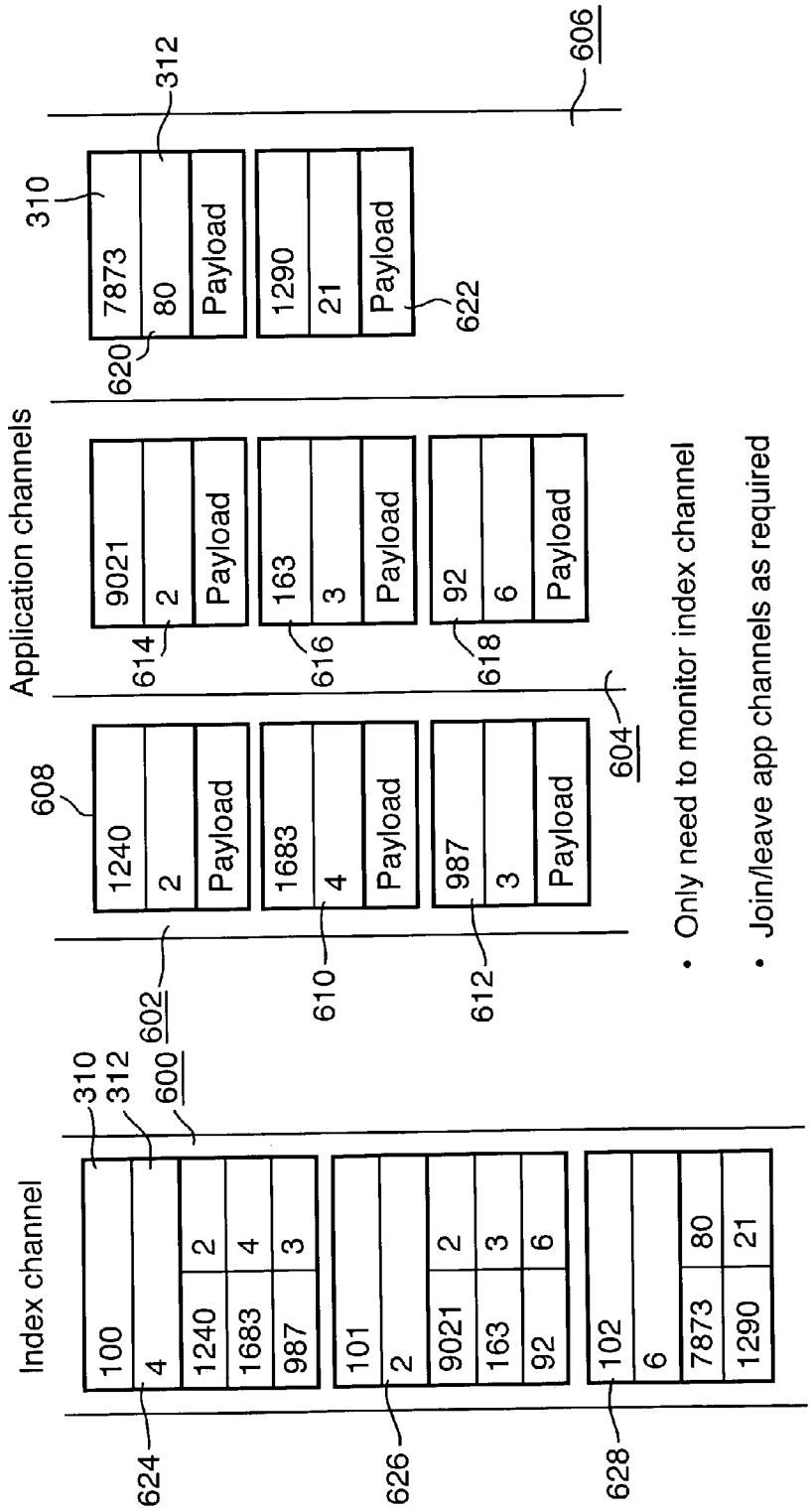
FIG. 6a is a schematic representation of structured data sets being transmitted on allocated multicast channels in the network of FIG. 1.

Referring now to FIG. 6a, a plurality of multicast channels 600, 602, 604 and 606 are provided for transmitting data to potential recipients over the Mbone. In the example shown data is transmitted on the channels in data sets which are multicast announcements constructed in accordance with the data structure of FIG. 3. Multicast channel 600 is designated as a primary multicast communications channel for transmitting one or more primary data sets. The multicast channel 600 may be considered to be a management channel. The remaining multicast channels 602, 604, 606 are designated secondary multicast channels and are for transmitting secondary data sets. The primary channel 600 defines an index channel for the secondary channels which define indexed channels. The indexed channels are each associated-with the index channel 600 by way of mappings between the data sets.

Three secondary data sets 608, 610 and 612 are initially assigned to the secondary multicast channel 602 for periodic re-transmission on that channel. Similarly three secondary data sets 614, 616, and 618 are initially assigned to the secondary multicast channel 604 and two secondary datasets 620 and 622 are initially assigned to the secondary multicast channel 606. The primary or index channel 600 comprises three primary or index data sets 624, 626 and 628, one for each secondary multicast channel.

Although the primary and secondary data sets shown in FIG. 6a are constructed in accordance with the data structure of FIG. 3, for clarity only the relevant data fields of these data sets are shown, that is the announcement identification field 310 and version field 312. The payload content is shown in detail for the primary data sets but not for the secondary data sets.

In FIG. 6a each data set is represented as a table comprising a vertical stack of parameter fields including, when viewed from top to bottom in the drawing, a first parameter field containing the announcement identification for that data set, a second parameter field containing the version number for that data set and a data set payload. For example the secondary data set 608 includes the number "1240" in the announcement identification field and the number "2" in the version number field.

The primary data sets further comprise payload data also in tabular form comprising a column containing secondary data set announcement identification numbers, shown to the left of the table in the drawing, and a further column containing version numbers, to the right of the table in the drawing. The first primary data set 624 is associated with the secondary communication channel 602 and comprises payload data including the announcement identification number and version number of each secondary data set assigned to that channel, that is the identification and version numbers of the secondary data sets 608, 610 and 612. Similarly the second primary data set 626 is associated with the secondary communication channel 604 and comprises payload data including the announcement identification number and version number of each secondary data set assigned to that channel, that is the identification and version numbers of the secondary data sets 614, 616 and 618. Finally, the third primary data set 628 is associated with the secondary communication channel 606 and comprises payload data including the announcement identification number and version number of each secondary data set assigned to that channel, that is the identification and version numbers of the secondary data sets 620, 622. Thus, each entry in the payload data of a primary data set maps an announcement identification number to the current version renumber for the secondary data set comprising that announcement.

In use, when a secondary data set is modified, for instance due to the data set payload data being updated, the version number for that data set is incremented, say by one, and on receipt of this change by a relevant receiver in the network the primary data set is changed, for instance by the application layer program 402 of an announcer associated with an appropriate authority responsible for the primary announcement channel. In this way, not only is the version number in the primary data set payload data incremented in the same way but so is the version number of the primary data set contained in the data set header field. Thus receivers that are required to monitor all three secondary channels 602, 604 and 606 for new or modified data set announcements only need to listen to the appropriate primary channel 600 to be informed that a relevant announcement has been modified, added or deleted. If the announcement is deemed to be relevant by a receiver, the receiver can temporarily join the secondary multicast channel to receive the next transmission of that announcement. Thus a receiver only needs to listen to the primary index channel to know that something has changed on one of the secondary indexed channels. The above described approach for data transmission is best described with reference to FIGS. 6b and 6c.

Figure 6B:
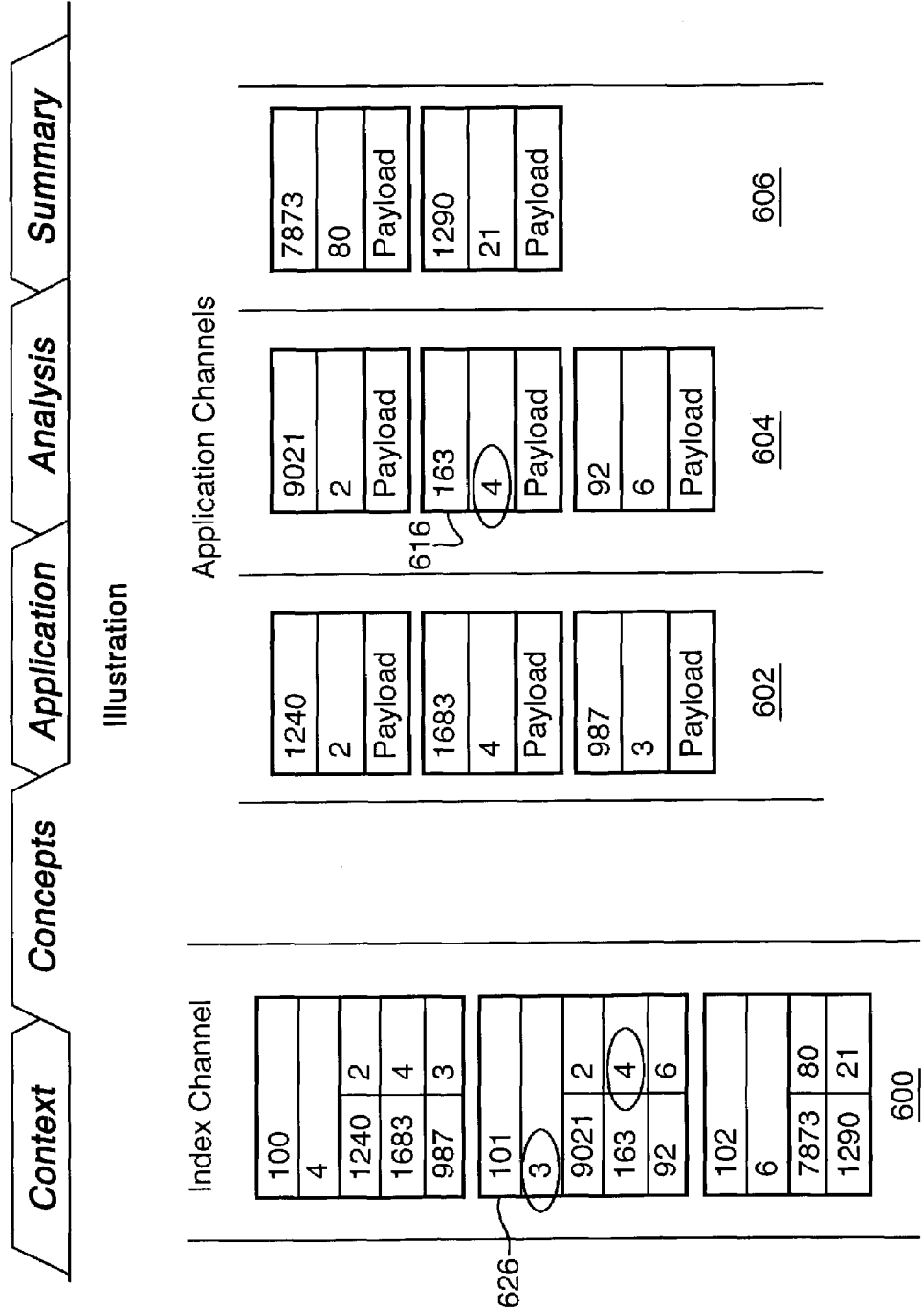
FIG. 6b is a schematic representation similar to FIG. 6a showing how potential recipients of the data sets may be alerted to changes to data sets.

In FIG. 6b the payload data of the secondary data set 616 has been modified and the version number incremented from "3" to "4" to indicate that a change has been made. In response to this change the primary data set 626 associated with the secondary channel 604 on which the data set 616 is transmitted is itself modified. The payload data representing the version number for the data set 616 is similarly incremented from "3" to "4" and the version number of the primary data set is also incremented, in this case from "2" to "3". Thus potential recipients of all three secondary data sets can be alerted to changes to the data set 616 simply by listening to data transmissions on a single primary index channel, in this example channel 600.

In FIG. 6c the secondary data set 618 has been re-assigned to channel 606 from channel 604. Thus, although the payload data of the data set 618 has not been modified the version number of the primary data sets 626 and 628 are modified so that potential recipients can be informed that a change relevant to this data set has taken place. The version number of the primary data seta 626 and 628 are incremented by one. In this respect the mappings between the primary: data sets and secondary channels can be used by a recipient of the primary data sets to locate the current secondary channel transmitting a secondary data announcement.

From the foregoing description it can be seen that a primary data set may be considered to be an index announcement or a management announcement that is associated with, but not sent over, a particular secondary multicast channel or indexed channel, where the index announcement consists of a table containing an entry for each announcement on that secondary channel. Each entry maps an announcement identification number to the current edition number for that announcement. Thus an index announcement gives an instant picture of the traffic being sent on one or more indexed channels. For a given set of indexed channels, a managed index channel can be created to send index announcements for each of these channels. This has a number of advantages: first, the receiver only needs to listen to the index channel to know that something has changed in one of the indexed channels. If the receiver application is interested in the affected announcement, it can temporarily subscribe to the appropriate indexed channel until it receives the full announcement; second, deletion of announcements on indexed channels is explicit, and can be communicated to end users without having to listen to the appropriate indexed channel, that is to say, if an announcement entry disappears from the index channel, it can be assumed that the announcement has been deleted; and, third, he index channel can be used to locate the correct indexed channel for a specific announcement. Moreover, migration of announcements across indexed channels can be readily implemented. Receivers can infer channel migration if an entry for an indexed announcement moves from one index announcement to another. The configuration announcement for an announcement tells the receiver which channel it is on, and will be updated itself to a new version if the channel on which the index sits is migrated. This would be a more reliable way to infer movement of announcements to new channels, as it is not guaranteed that the receiver is listening to the new index announcement, as well as the old. This makes it possible to dynamically control the distribution of indexed announcements, for example for network performance reasons, etc.

It is also possible to provide more than one index channel, and transmit index announcements on more than one index channel. This could be useful in applications where different receivers are likely to be interested in different subsets of available indexed application channels.

Figure 6D:
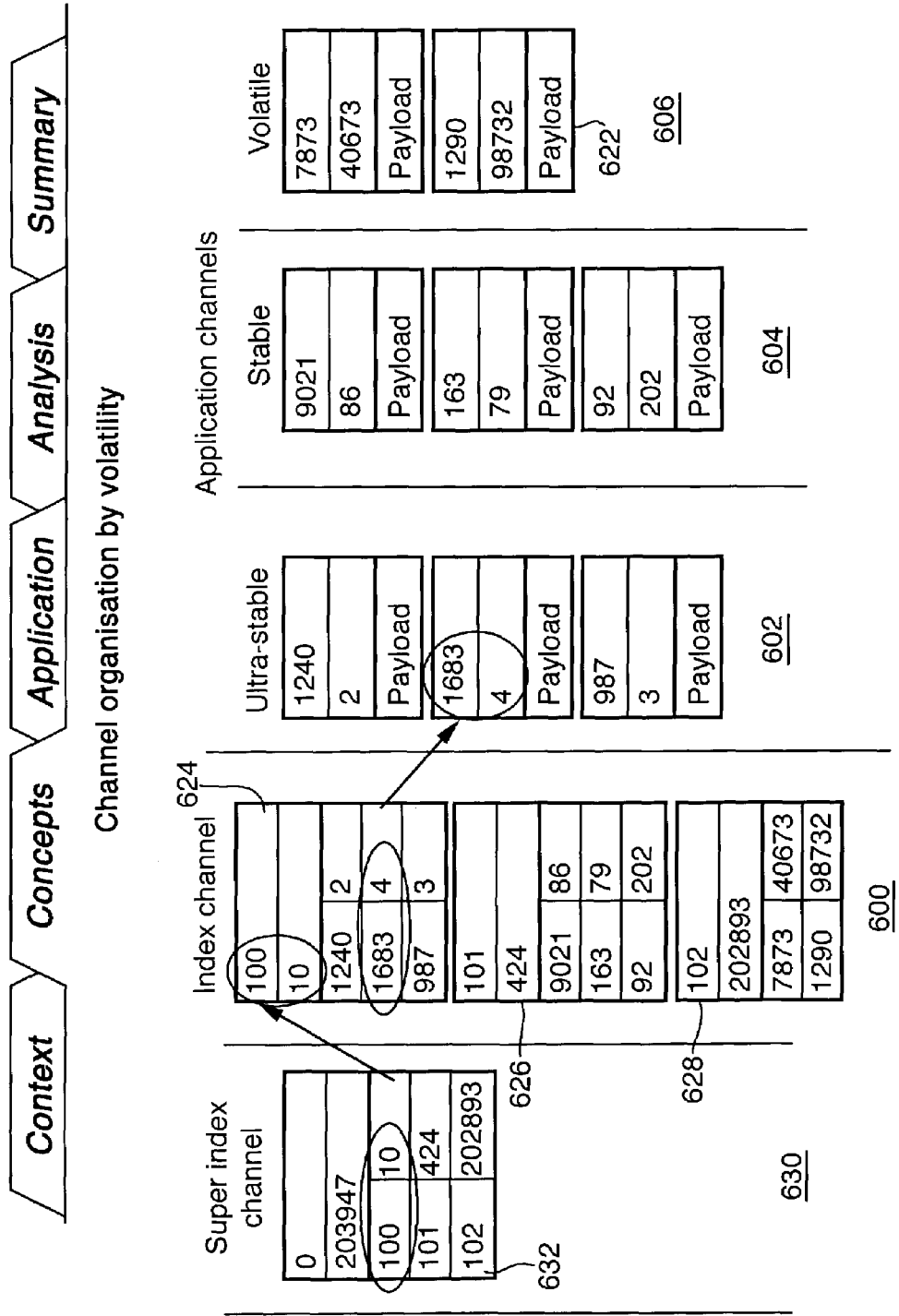
FIG. 6d is a schematic representation similar to FIG. 6a showing how a hierarchy of data sets and multicast channels is used for efficient data dissemination.

With reference to FIG. 6d, in a slightly different example a hierarchy of index channels is provided, that is to say a parent index channel 630 is provided for announcing an index announcement data set 632 which comprises payload data including the announcement identification number and current edition number of each of the primary data sets 624, 626 and 628 in much the same way that primary data sets include those same parameters for the indexed or secondary data sets. It should be made clear, that in this arrangement, no level in the hierarchy is necessarily absolutely primary since that level could always be included in some other index. In the arrangement of FIG. 6d, the secondary channel 602 is allocated for the transmission of announcements that rarely change, the secondary channel 604 is allocated for announcements that are relatively stable, and the secondary channel 606 is allocated for announcements that change often. In FIG. 6d the secondary data set 622 is transmitted on channel 606 which indicates that its payload data is volatile and updated often. The data set 622 has an announcement identification number "1290" and a current edition number "98732" which may be incremented every two minutes say, and cause the current edition number of the associated primary data set 628 to be similarly incremented as described previously. In the same way the current edition number of the index data set 632 will also be updated along with the current edition number carried in the index data set payload for the primary data set 628.

In the example of FIG. 6d, repeated announcements of the index data set 632 will show recipients that the volatile data sets on channel 606 are continually changing. However, if a stable data set on channel 602 is modified an indication of this will be immediately transmitted to recipients of the index data set 632 since the current edition number for the index announcement "100" will have been incremented. In this way potential recipients may join the appropriate primary channel to determine which secondary channel they need to subsequently join to receive the updated announcement of the normally stable data set. In this way information that does not change regularly can be readily notified to interested parties by using the same network infrastructure, receivers and announcers for example, that is normally used for transmitting and/or receiving data set announcements that are modified on a very regular basis. This is a very efficient way of alerting recipients to changes to normally stable secondary data set announcements since only a few bytes of additional payload is required in the index data set 632 to provide an indication of such changes to recipients of that data set. If a receiver is not interested in any changes to announcements under say index 626, obviously it can join the channels to listen to changes to just 624 and 628, rather than listen to the super index 632. Because any change in an announcement is reflected in all indexes above that announcement in the hierarchy, this allows receivers to shield themselves from hearing about changes they have no interest in.

Generation of index announcements is straightforward in a single sender environment. However, supporting multiple senders is more complicated, and may be done in one of two ways: In one way the senders appoint an index authority to co-ordinate the sending of index announcements. In this way, senders inform the index coordinating authority prior to changing announcements on an indexed channel so that the modified index announcement is transmitted prior to the modified indexed announcement. In this way potential recipients monitoring an index channel for index announcements will receive prior notification that an indexed announcement they are interested in is to be updated and have sufficient time to join the indexed announcement channel, that is the appropriate multicast channel, before the first announcement is transmitted on that channel. The appropriate delay between the updated index and indexed announcements is determined by the application associated with the indexed announcement. For instance if sub second delays are unimportant a delay of say 2 seconds should be sufficient for most round trip times on the current (June 2000) Internet. However, if sub second delays are important the time delay may be too short for most of the interested recipients to join the appropriate multicast channel before the first announcement is made. With most multicast tree topologies, for example Core Based Trees, an appropriate time delay may be approximately equal to the minimum round trip time of all the recipients. This is due to the fact that multicast routing messages from those recipients that have the minimum round trip time will cause a small tree to be established to the appropriate announcement source. Subsequently as more recipients join the channel their routing messages will propagate towards the source and attach to the lower branches of the routing tree being formed. Thus, if timed correctly the tree will grow just ahead of the updated indexed announcement. Of course, the new announcement can be repeated a few times so that any receiver missing any part can catch-up subsequently. Therefore delay can be minimised for the majority without the remainder losing anything, at least eventually.

Another approach is for the index coordinator to generate the index announcements automatically by listening to the indexed channels and processing the received announcements so that the index announcement is modified subsequently to the indexed announcements.

In another way, each sender is responsible for generating an index announcement for their own indexed announcements. This approach does not require the appointment of a co-ordinator. However, in a situation where there are several senders generating a few announcements each it makes slightly less efficient use of index channels. This is due to the index announcements being split into smaller per-sender index announcements, resulting in a greater overall volume of data on the index channels. Yet another approach is for a number of senders to all be indexed in the same index and they all send to and receive from the same multicast channel for the index. Any one of them can update the index based on the most recent copy they last heard from anyone else (including themselves) on the multicast. Any sender making a change to its secondary data can also update and send out a new index with the necessary change to reflect their own change. This scheme works best when it is very unlikely that two senders will co-incidentally make different changes to the index so close to each other in time that they cross over on the network.

Figure 7:
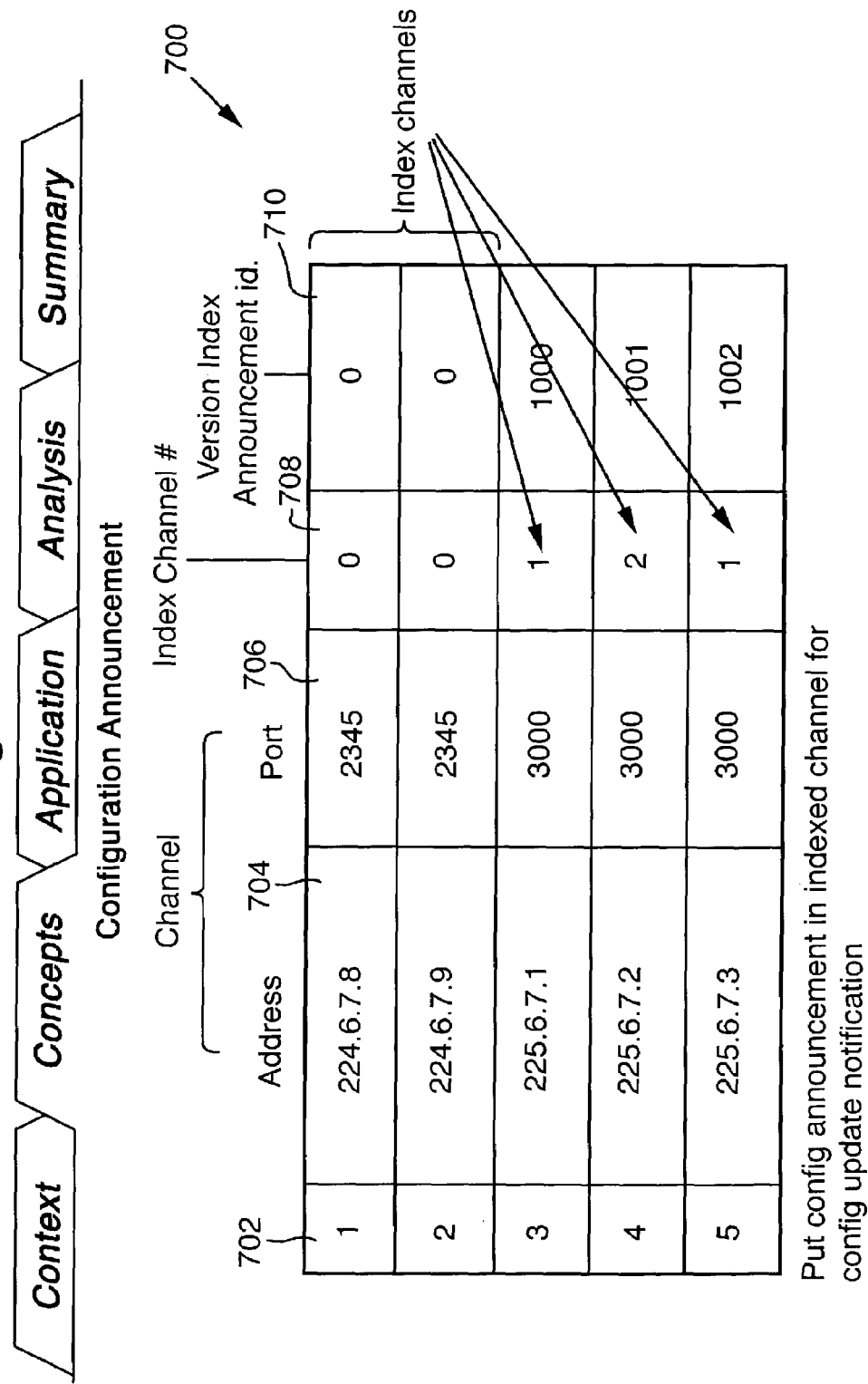
FIG. 7 shows representative data set payload data comprising network connection data for the multicast channels.

Referring now to FIG. 7, the payload data of at least one of the secondary data sets comprises network connection data for a managed group of primary (index) and secondary (indexed) multicast channels. A representative payload comprising connection data for a managed group of two index and three indexed multicast channels is shown in the table 700 in FIG. 7. The table comprises a first column 702 storing row identification numbers, a second column 704 storing the IP multicast group address allocated to each multicast channel, a third column 706 storing the destination port number for each channel, a fourth column 708 indicating the multicast index channel the indexed channels are associated with and a fifth column 710 storing the announcement identification number of the index channel announcement for each indexed channel.

Depending on the application, channel configuration may be static and/or may be described through some other means. In particular, the same format of payload as in FIG. 7 may be used, but not transported as an announcement, but perhaps instead as the response to a unicast request. The configuration announcement provides one way of communicating the channel configuration to new receivers, or to communicate a change in configuration to existing receivers. Using a configuration announcement, receivers only need to be given the channel address and announcement identification number of the configuration announcement itself. This enables each receiver to receive configuration details to set up the other multicast channels as required. If the configuration announcement is itself placed in an indexed channel, then it becomes possible to learn of channel re-configurations without listening continuously to a designated configuration channel. This would be particularly appropriate, as configuration information is likely to be extremely stable, with only very occasional changes.

The above described transport protocol provides for efficient dissemination of information to multiple recipients, particularly-in circumstances where the group of recipients is large and dynamic, where announcements are frequently updated or where the receiving applications are not sensitive to delay. The following analysis compares the bandwidth requirements for the above described transport protocol with the requirements for known unicast client/server approaches. The analysis assumes that traffic generated by indexing is negligible.

1) For the announcer (or server) side:—

$s_a$ denotes the average size of an announcement (bytes)

$n_r$ denote the number of recipients $n_a$ denote the number of announcements $t_a$ denote the average period between updates to an announcement The number of payload bytes that must be sent by the announcer or server over a time period T is given by:

| | |
|---|---|
| client/server solution: | $S_u = (T/t_a) n_r n_a s_a$ |
| multicast announcer solution: | $S_m = (T/t_r) n_a s_a$ |
| (where $t_r$ is the repetition period) | |
| Require: | |
| $S_m < S_u$ | |

-continued $(T/t_r) n_a s_a < (T/t_a) n_a n_r s_a$
$t_a < t_r n_r$

Thus, from a network bandwidth point of view, the above described protocol is more efficient if the average time between announcement updates is less than the length of an announcement cycle multiplied by the number of receivers.

EXAMPLE $n_r$=6000, $t_a$=3600, require $t_r$>0.6 s, that is to say the announcement repetition period, $t_r$, can be as low as 0.6 seconds before the client/server unicast approach is a more efficient solution.

2) For the receiver (or client) side:

The receiver or client-side network load is inevitably higher than it would be for unicast. However, the concept of channel indexing reduces this load considerably, so that over a 'quiet period' (no changes), typical bandwidth use would be in the order of a few thousand bits per second. This will temporarily increase whenever the receiver joins an application channel to obtain an announcement of interest.

In one example the above described protocol is used for disseminating tariffs and metering parameters in a dynamic pricing environment for IP network usage charging as described in the applicants co-pending International patent application no. PCT/GB 99/01765. This application discloses the concept of keeping customers up to date with tariffs and metering rules, while the customer is responsible for measuring their traffic and generating their bill. Within this environment, there is a requirement for the service provider to be able to announce tariffs and metering rules for different products to different customers. Tariff and metering information announcements can be made for each of the products on offer with the above protocol. Customers can listen to an appropriate index channel and thereby be alerted of updates with respect to the products they are using. In addition the above mentioned protocol provides for announcements informing customers of new tariffs and metering rules in advance of them being activated by the service provider. This makes use of a design pattern utilising well known announcement identification numbers wherein each announcement in the system is mirrored by another announcement that indicates what the payload parameters will be when the tariff is next updated. This enables recipients to prepare for the change in advance, or make decisions based on knowledge of this information. For example, if the service provider indicates that prices will be lower from a certain time onwards, some customers may prefer to wait for that time before performing certain tasks.

In another example the above described protocol is used as a replacement for SAP, that is to say for transmitting media session descriptions. The media session descriptions may be constructed in accordance with SDP or a modular type session description, for example the session description described in the applicant's patent application no. GB9826158.9. This patent application describes the concept of a session description comprising a hierarchy of modules. In one example using the above described protocol the modules are transmitted as separate announcements on separate channels. In this example a root module is transmitted on a well known session channel which functions as an index channel and the robot module announcement contains references to the child modules transmitted on other channels.

Figure 8A:
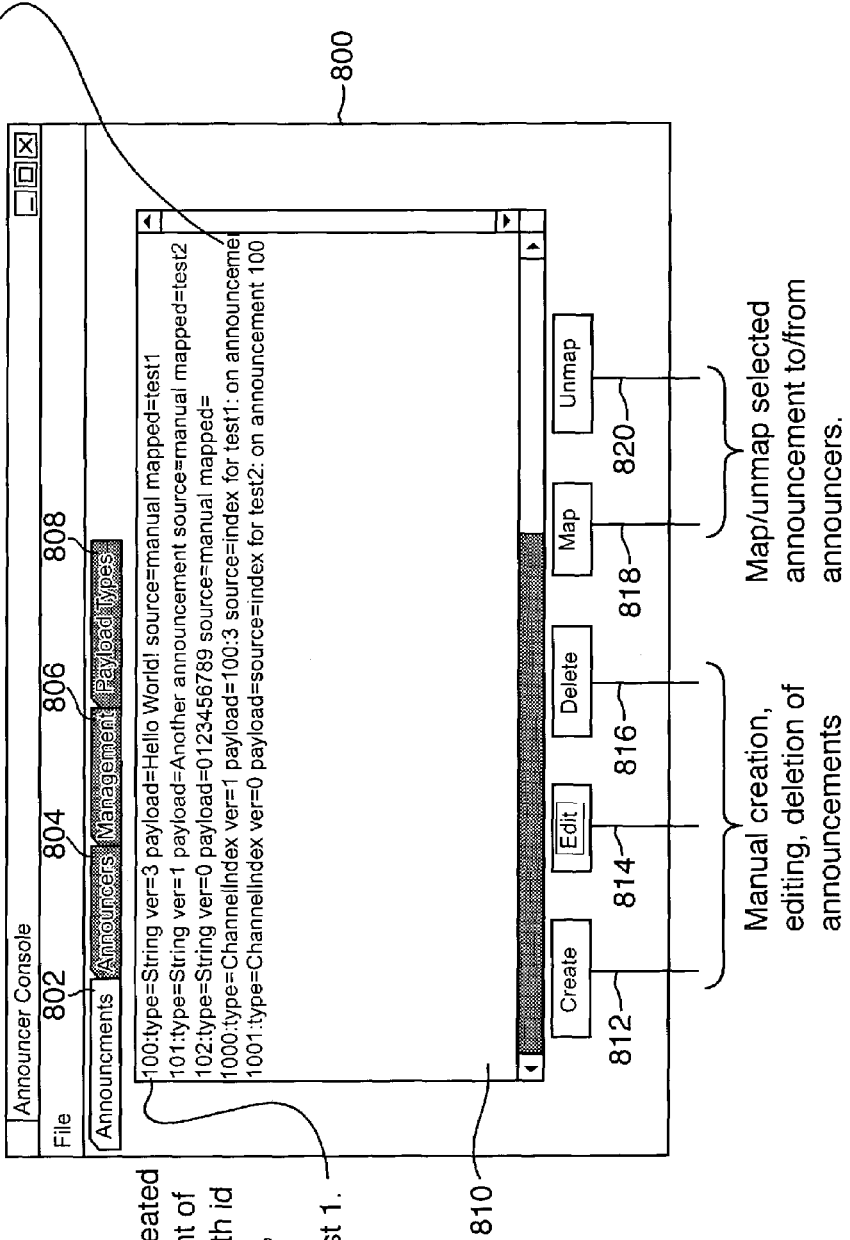
FIG. 8a shows a Graphical User Interface (GUI) for use with the announcer of FIG. 4, including data representing announcements for transmission.
Figure 8C:
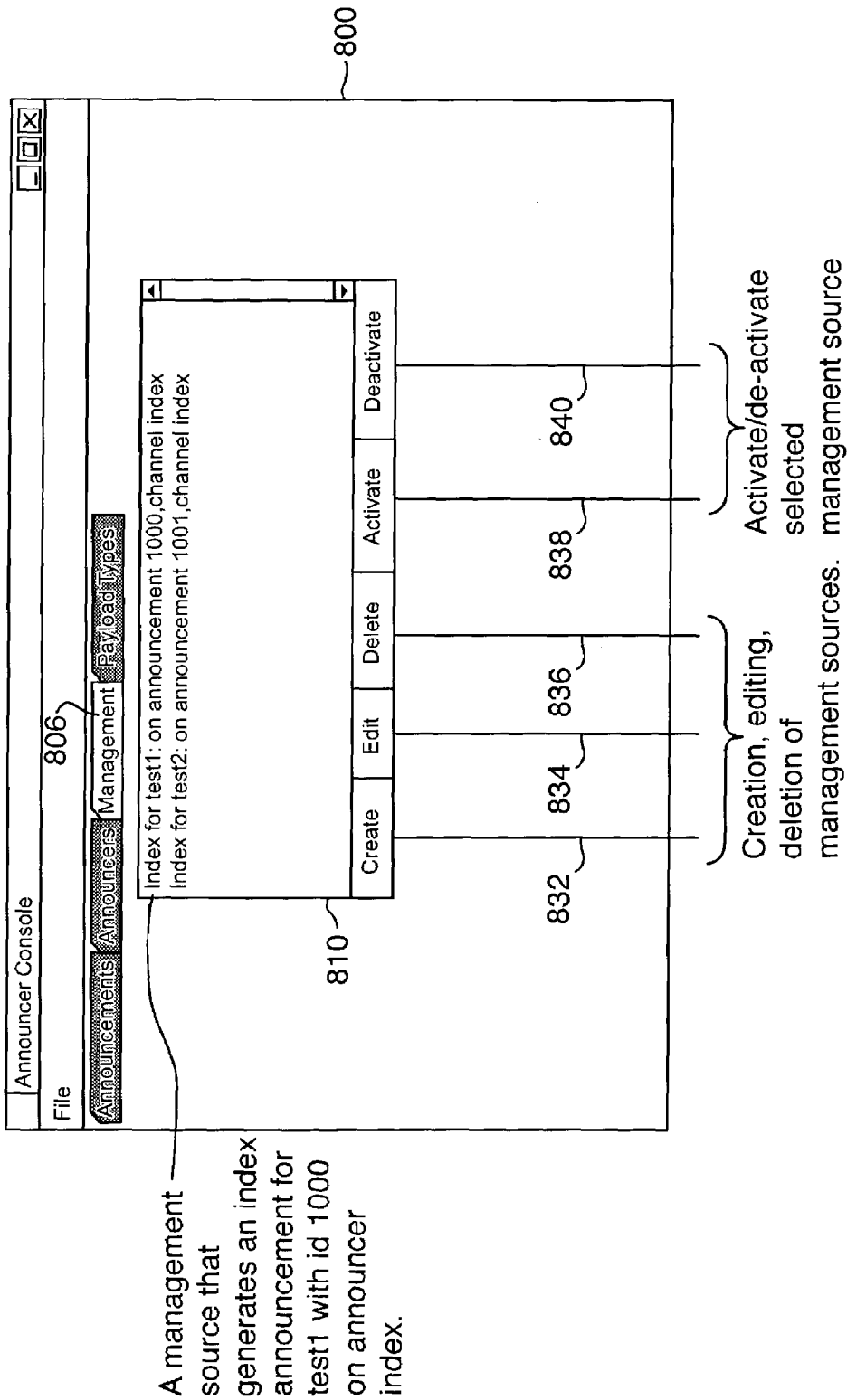
FIG. 8c shows the GUI of FIG. 8a including data relating to multicast announcement index channels.

Referring now to FIGS. 8a to 8c which show screen shots of an announcer side graphical user interface (GUI) 800. It is an example application, which intentionally reveals the inner workings of the protocol, unlike more typical applications. This application fills the role of the announcement source 200 in FIG. 2. An announcer 202 runs as middleware to support the application. The GUI may be implemented as a software program installed on the announcer 400. The GUI 800 comprises selectable tabs including a tab 802 labelled "Announcements", a tab 804 labelled "Announcers", a tab 806 labelled "Management" and a tab 808 labelled "Payload Types", the screen shots 8a to 8c show the GUI 800 with the tabs 802, 804 and 806 selected respectively. On each tab there is provided a text area 810 for displaying relevant data relating to data set announcements. The tab 802 comprises five buttons which may be selected by mouse click or other user invoked command. A first button 812 is labelled "Create" a second button 814 is labelled "Edit", a third button 816 is labelled "Delete" a fourth button 818 is labelled "Map" and a fifth button 820 is labelled "Unmap". The first button 812 is for creating new announcements, the second button 814 for editing existing announcements and the third button is for deleting existing announcements from the announcer cache. The fourth button 818 is selected for mapping each multicast announcement to a multicast announcer comprising an IP multicast address and port number, to be explained with reference to FIG. 8b. The fifth button 820 is selected for removing a previously assigned announcement and IP address/port mapping. As can be seen from FIG. 8a, each line of text in the text box 810 comprises an announcement. The first line comprises an announcement having an announcement identification number "100" and is of type "String" that is to say the announcement payload comprises the String "Hello World!". The announcement "100" has a current edition or version number "3" and is mapped to the announcer or channel "test1". The second and third announcements are both of the same type as the first. The fourth and fifth announcements are so called "management announcements" and correspond to index announcements for the announcers or announcement channels "test1" and "test2" respectively.

Referring now to FIG. 8b, The tab 804 comprises five buttons, including a first button 822 is labelled "Create" a second button 824 is labelled "Edit", a third button 826 is labelled "Delete" a fourth button 828 is labelled "Activate" and a fifth button 830 is labelled "Deactivate". The first button 822 is for creating new announcers for multicast channels, the second button 824 for editing existing announcers and the third button 826 is for deleting existing announcers, or example the announcer "test1" on IP multicast channel 229.6.7.8, port 1234. The fourth button 828 is selected for starting an announcer, that is to say to start transmitting announcements on the channel. The fifth button 830 is selected for stopping a selected announcer transmitting. As can be seen from FIG. 8b, each line of text in the text box 810 relates to an announcer. The first line defines that the announcer "test1" on IP multicast address 229.6.7.8, port 1234 is in suspended state that is to say the announcer has been de-activated by selection of button 830. The second announcer "test2" is also in suspended state. The third line defines that the announcer "index" on IP multicast address 230.6.7.8, port 1234 is currently sending announcements, that is the announcer has been activated by selection of button 528.

Referring now to FIG. 8c, The tab 806 comprises five buttons, including a first button 832 labelled "Create" a second button 834 labelled "Edit", a third button 836 labelled "Delete", a fourth button 838 labelled "Activate" and a fifth button 840 labelled "Deactivate". The first button 832 is for creating new management sources or index announcements and assigning index channels to such announcements, the second button 834 for editing existing index announcements and the third button 826 is for deleting existing index announcements. The fourth button 838 is selected for activating selected index announcements, that is to say to actively assign indexed channels to index announcements. The fifth button 840 is selected for de-activating selected index announcements. As can be seen from FIG. 8c, each line of text in the text box 810 relates to an index announcement. The first line defines that the index announcement is for the indexed channel "test1", that the index announcement identification number is "1000" and that the index announcement is assigned to the index channel "index", that is to IP multicast address 230.6.7.8, port 1234 (see FIG. 8b).

In FIG. 8a, two payload types are shown: String and ChannelIndex. With the Payload Types tab selected, the user can create further payload types.

Referring now to FIGS. 9a to 9d which show screen shots of a receiver side graphical user interface (GUI) 900. Again, this is an example application, which intentionally reveals the inner workings of the protocol, unlike more typical receiving applications. This application fills the role of the announcement sink 206 in FIG. 2. A receiver 204 runs as middleware to support the application. The GUI may be implemented as a software program installed on the receiver 500. The GUI 900 comprises selectable tabs including a tab: 902 labelled "Status", a tab 904 labelled "Receivers", a tab 906 labelled "Handlers" and a tab 908 labelled "Management" and a tab 910 labelled "Payload Types", the screen-shots 9a to 9d show the GUI 900 with the tabs 902, 904, 906 and 908 selected respectively. On each tab there is provided a text area 912 for displaying relevant data relating to data set announcements. The text area on tab 902 is divided to show on one side (to the left of the drawing in FIG. 9a) a text box 914 displaying status information relating to each of the multicast channels the receiver is listening to, and on the other side (to the right of the drawing) a text box 916 displaying the received announcements. The first line of text in box 912 indicates that the receiver is listening to the channel "test1" on IP multicast address 229.6.7.8, port 1234 and the status of the receiver for this channel is "running-suspended" that is to say the IP multicast socket for this channel is assigned to but has not joined the IP multicast group address. The first line of text in box 914 indicates that the announcement having an announcement identification number "101" and a current edition or version number "0" has been received.

Figure 9A:
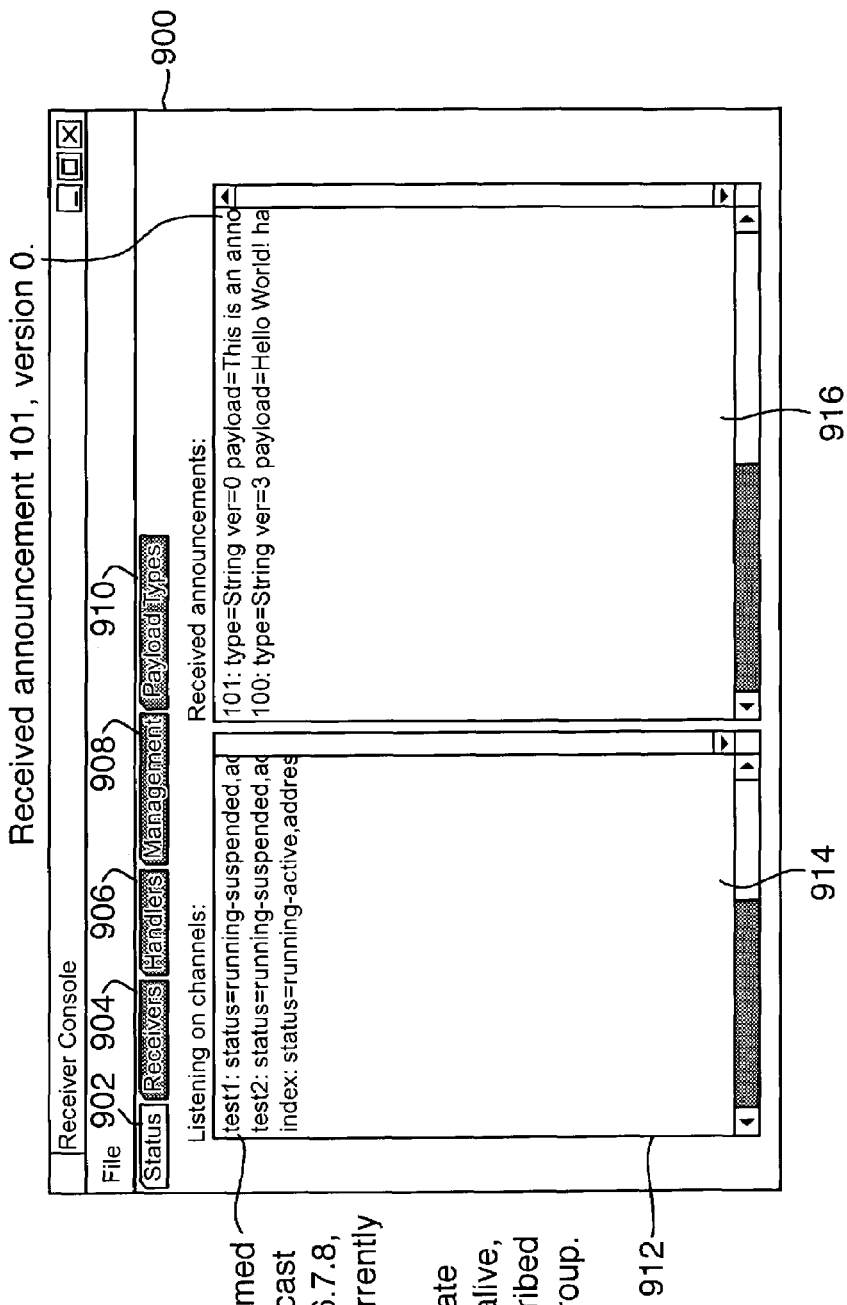
FIG. 9a shows a Graphical User Interface (GUI) for use with the receiver of FIG. 5, including data representing relevant channels and announcements received over the network.
Figure 9B:
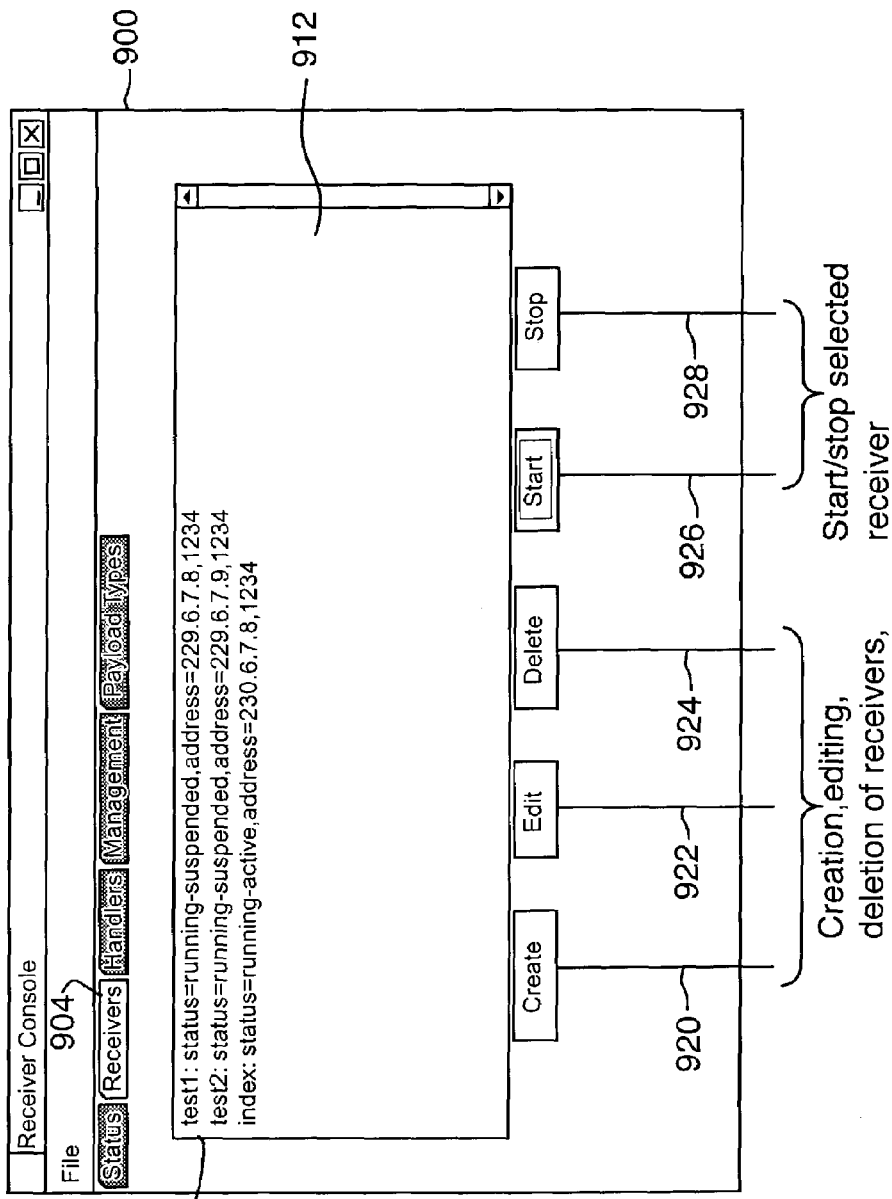
FIG. 9b shows the GUI of FIG. 9a including data representing the activation status and connection data of a plurality of multicast channels

With reference to FIG. 9b, the tab 904 comprises five buttons which may be selected by mouse click or other user invoked command. A first button 920 is labelled "Create" a second button 922 is labelled "Edit", a third button 924 is labelled "Delete" a fourth button 926 is labelled "Start" and a fifth button 928 is labelled "Stop". The first button 920 is for creating new receivers for multicast channels, the second button 922 is for editing existing receivers and the third button 924 is for deleting existing receivers, for example the receiver "test1" on IP multicast channel 229.6.7.8, port 1234. The fourth button 926 is selected for starting a selected receiver, that is to say to start listening for announcements on the channel assigned to the receiver. The fifth button 928 is selected for stopping a selected receiver listening to and receiving announcements. As can be seen from FIG. 9b, each line of text in the text box 912 relates to a receiver. The first line defines that the receiver for announcements on channel "test1" on IP multicast address 229.6.7.8, port 1234 is in running-suspended state that is to say the receiver has been de-activated by selection of button 928. The second receiver "test2" is also in running-suspended state. The third line defines that the receiver "index" on IP multicast address 230.6.7.8, port 1234 is currently receiving announcements, that is the receiver has been activated by selection of button 926.

Referring now to FIG. 9c, the tab 906 comprises three buttons, including a first button 930 labelled "Create" a second button 932 is labelled "Edit", a third button 934 is labelled "Delete". The first button 930 is for creating new handlers for the multicast channels, the second button 932 is for editing existing handlers and the third button 936 is for deleting existing handlers. The first line of text in the text box 912 relate to a simple handler for the receiver on IP multicast channel 229.6.7.8, port 1234. This handler interprets the payload of all announcements on "test1" as Strings and displays the received payloads in the received announcements text box 916.

In FIG. 9d, tab 908 comprises a first text box 940 for displaying information relating to each index receiver and a second text box 942 for displaying information relating to each indexed receiver. Two buttons 944 and 946 are provided for respectively adding and removing multicast channels from the index channel list in text box 942 and similarly two buttons 948 and 950 are provided for adding and removing multicast channels from the indexed channel list in text box 942. In FIG. 9, the first text box 942 comprises a single entry which designates the channel "index" on IP multicast address 230.6.7.8, port 1234 as an index channel. The second text box comprises two entries, the first of which defines that the announcement "1000" contains an index for announcements on the channel "test1" on IP multicast address 2229.6.7.8, port 1234.

Figure 10B:
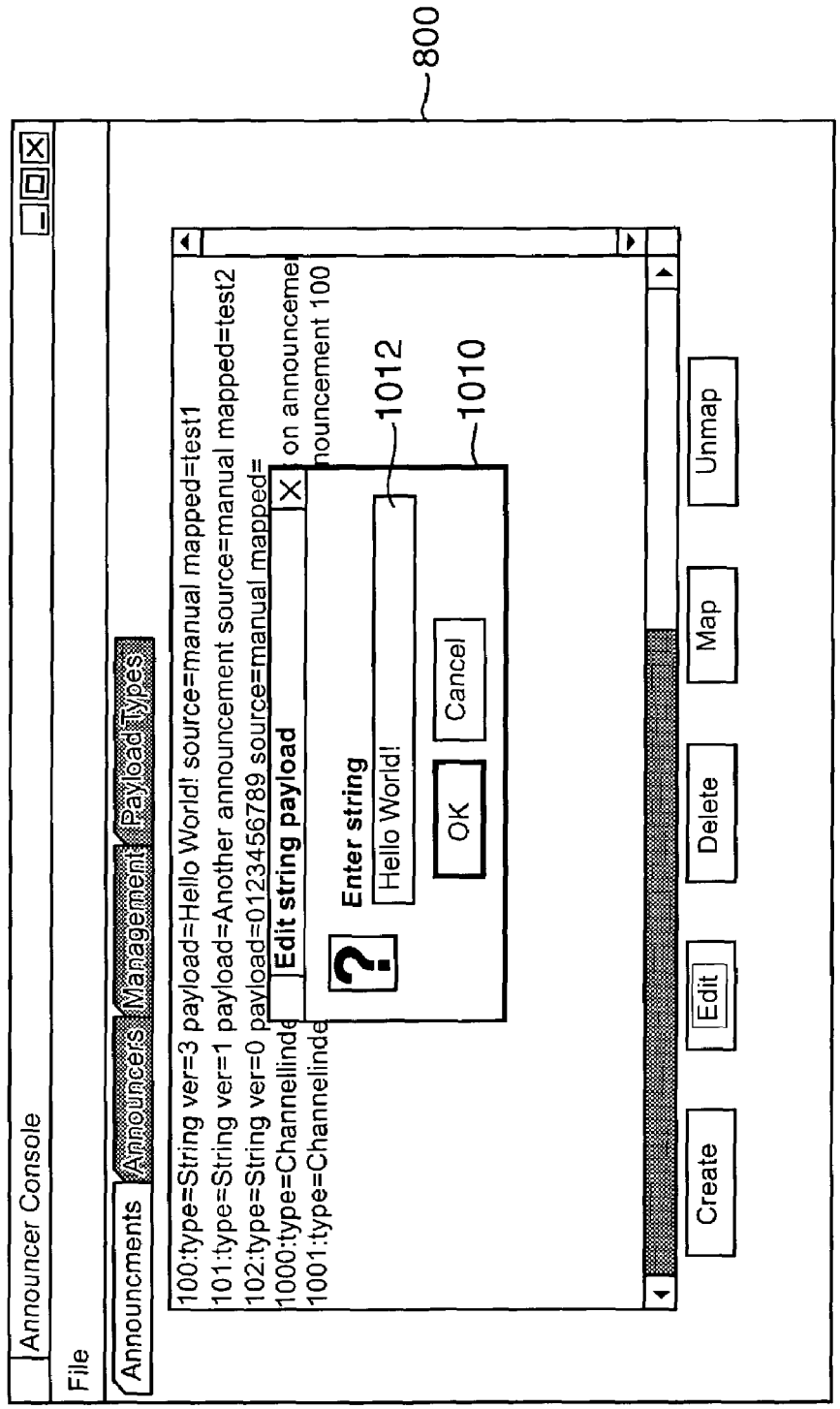
Figure 10C:
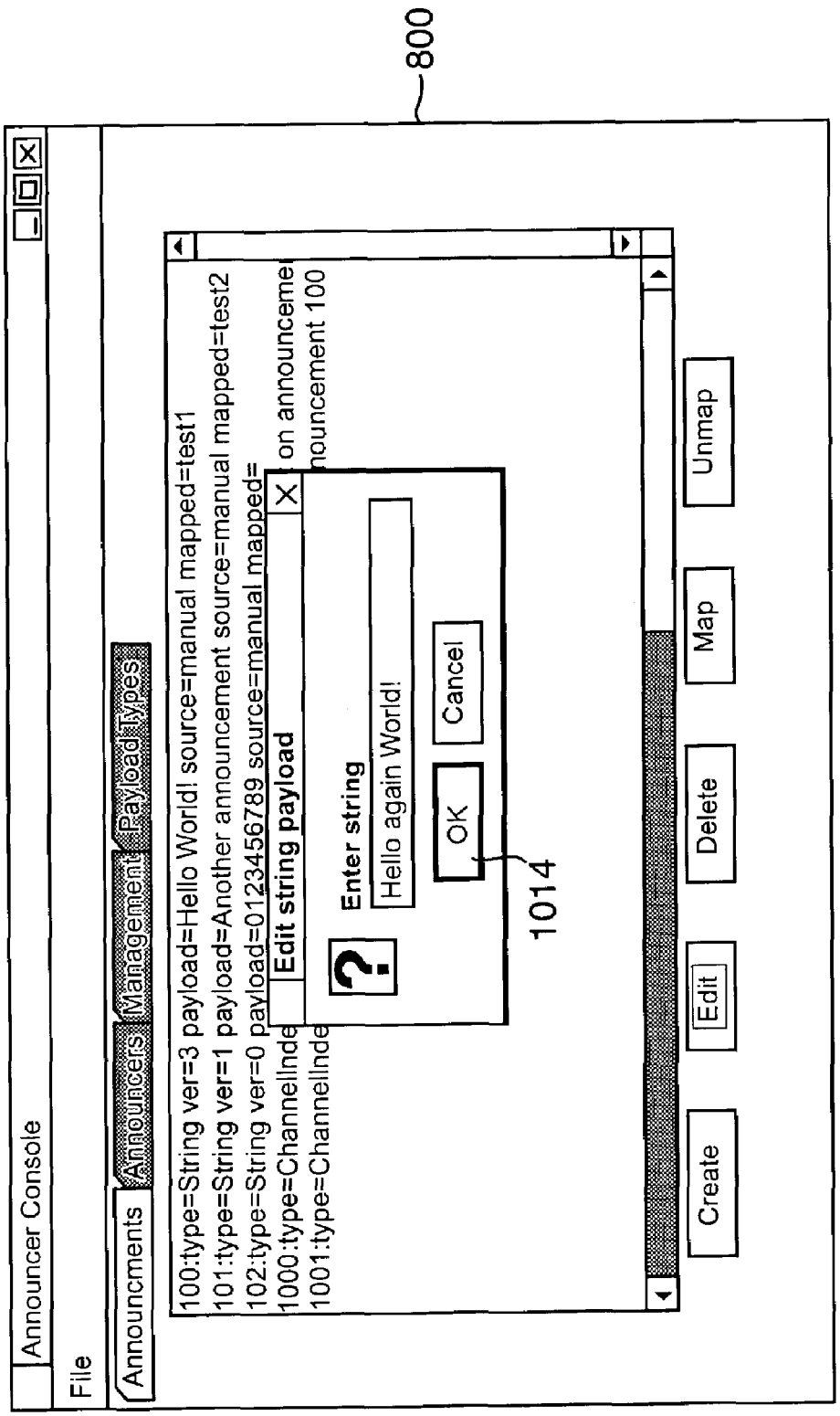
Figure 10D:
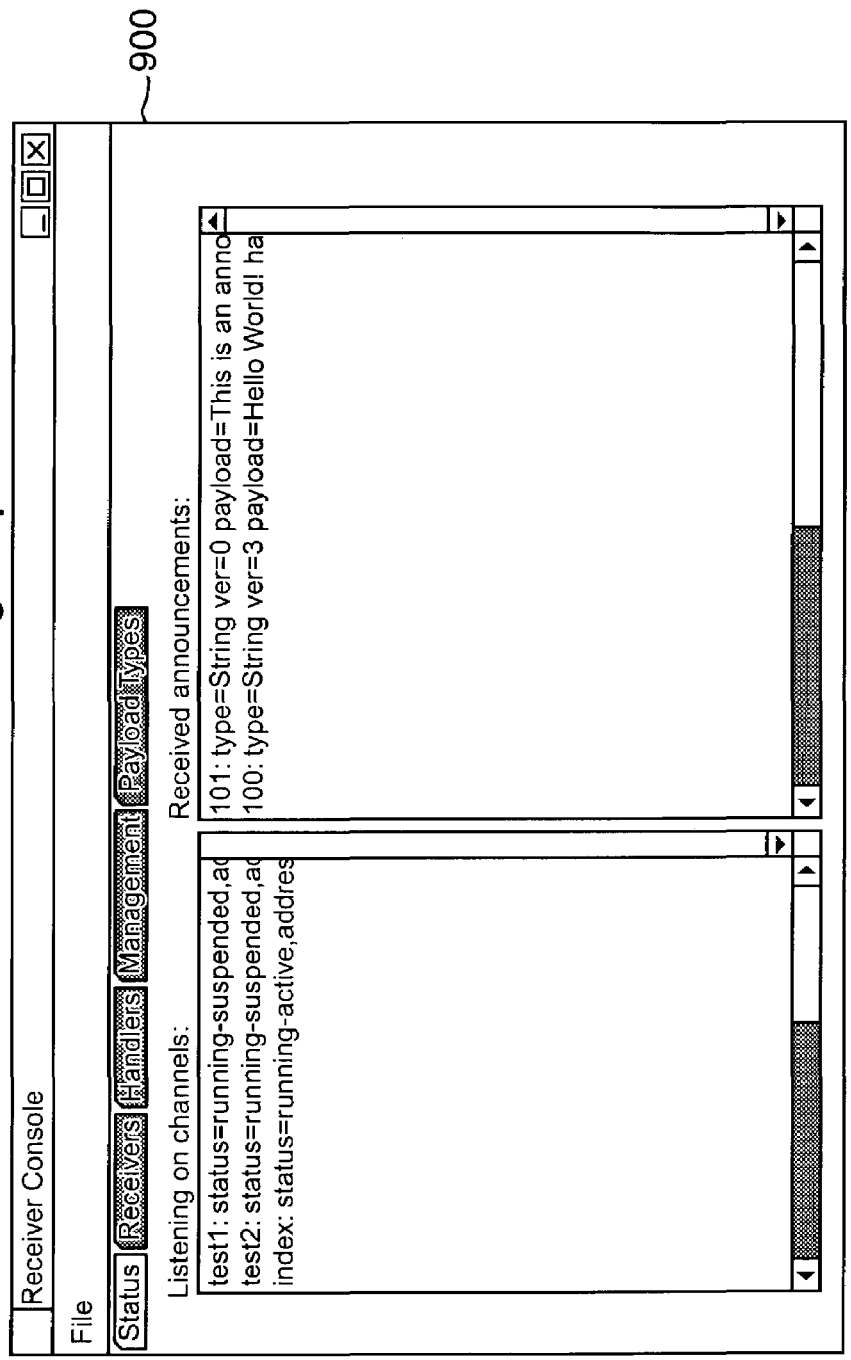
Figure 10E:
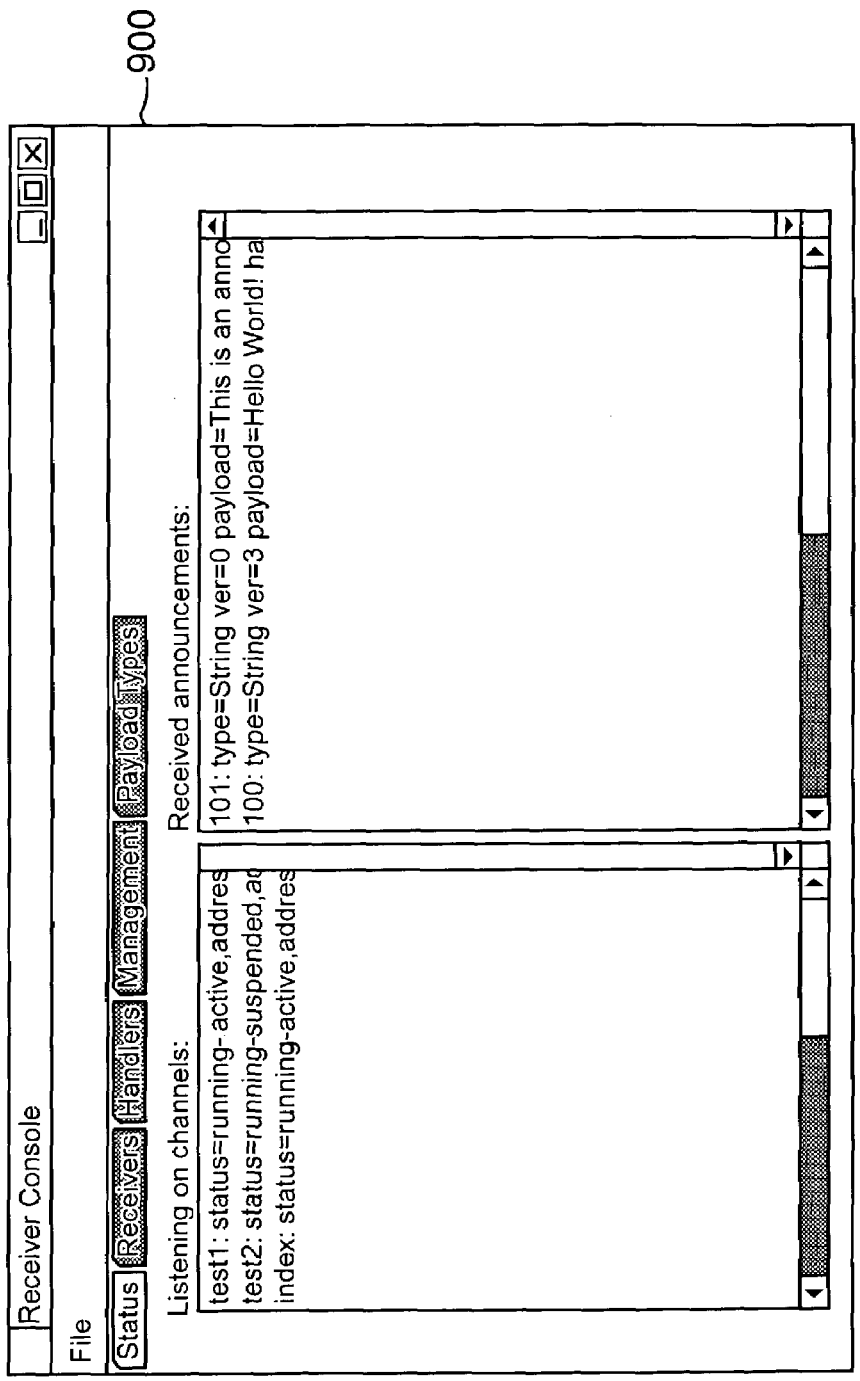
Figure 10F:
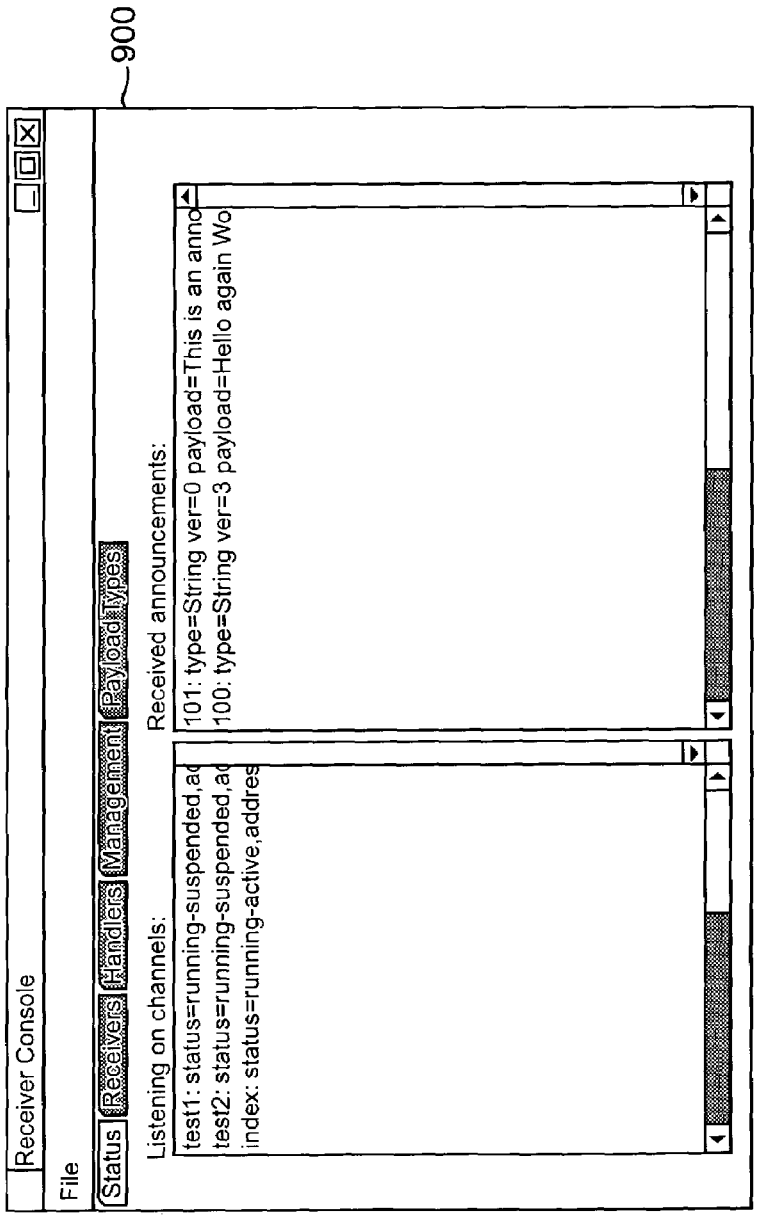

Referring now to FIGS. 10a to 10f which relate to a series of screen shots for the announcer and receiver side GUI's 800 and 900 for one example of an announcement update. In FIG. 10a the tab 802 has been selected on the GUI 800 and the first announcement "100" on the first line of the text box 810 has been selected and the relevant text highlighted. The announcement "100" is selected for editing and when the edit button 814 is pushed a dialog box 1010 appears in the text box 810 (FIG. 10b) with the existing String payload of that announcement displayed in a further text box 1012 in the dialog box. The String payload is edited as shown in FIG. 10c and when this is completed the user pushes the button 1014 labelled "OK" also in the dialog box. Since the announcement "100" is mapped to the indexed channel "test1" which is assigned to the index channel "index" the multicast socket on the receiver for the channel "index" receives the updated index announcement "1000" now with an incremented version number "4" (not shown) on channel "index and this causes the receiver for channel "test1" to activate. In FIG. 10d the receiver for channel "test1" is initially shown to be suspended, that is to say it has not joined the multicast channel for "test1". In FIG. 10e the receiver for channel "test1" has been activated by receipt of the updated index announcement "1000" and the status for "test1" becomes running-active, that is to say as the relevant multicast channel is joined. The updated indexed announcement "100" with version number "4" is then displayed together with the updated payload "Hello again World!" in the received announcements text box of the GUI 900 as shown in FIG. 10f.

What is claimed is:

1. A method of transmitting data in a multicast communications network said method comprising:

i) defining one or more primary data sets for broadcast transmission over at least one primary multicast communications channel in a communications network; each primary data set comprising data relating to a respective set of two or more secondary data sets associated therewith and provided for transmission over one or more secondary multicast communications channels;

ii) repeatedly transmitting (a) said primary data set or sets over said primary multicast communications channel(s) and (b) said secondary data sets over said secondary multicast communications channels;

iii) modifying said primary data sets respectively as required in response to modifications to at least one secondary data set in the respective sets associated therewith;

iv) repeating step iii) to provide potential recipient(s) of said primary data sets with an indication that at least one secondary data set has been modified independently of said recipient(s) receiving the modified secondary data set or sets, wherein at least one secondary data set comprises at least a description of a media session to be transmitted over said network.

2. A method according to claim 1 further comprising receiving at least one secondary data set over said secondary multicast communications channel or channels and processing said at least one secondary data set to determine whether said at least one secondary data set has been modified.

3. A method according to claim 1 wherein each data set comprises a data set identifier, a current edition parameter, and a data payload, wherein the data payload of each primary data set comprises the data set identifier and the current edition parameter of each associated secondary data set.

4. A method according to claim 1 further comprising allocating each of said data sets to a multicast channel.

5. A method according to claim 3 wherein said current edition parameter for each secondary data set is modified in response to changes to said secondary data set payload data, thereby to provide recipients of each primary data set with an indication of the identity of each modified secondary data set.

6. A method according to claim 3 wherein each current edition parameter is provided with an initial value and wherein the value of said parameter is incremented in response to the data set payload data being modified.

7. A method according to claim 3 wherein each primary data set is associated with a secondary multicast communication channel and the current edition parameter of each primary data set is incremented in response to the deletion or addition of at least one secondary data set for transmission on the secondary multicast communication channel.

8. A method according to claim 3 wherein at least one secondary data set comprises payload data including at least network connection data for primary and secondary multicast communication channels.

9. A method of transmitting data in a multicast communications network said, method comprising:

i) defining one or more primary data sets for broadcast transmission over at least one primary multicast communications channel in a communications network; each primary data set comprising data relating to a respective set of two or more secondary data sets associated therewith and provided for transmission over one or more secondary multicast communications channels;

ii) repeatedly transmitting (a) said primary data set or sets over said primary multicast communications channel(s) and (b) said secondary data sets over said secondary in multicast communications channels;

iii) modifying said primary data sets respectively as required in response to modifications to at least one secondary data set in the respective sets associated therewith;

iv) repeating step iii) to provide potential recipient(s) of said primary data sets with an indication that at least one secondary data set has been modified independently of said recipient(s) receiving the modified secondary data set or sets, wherein at least one secondary data set comprises at least tariffing parameters for calculating a charge for network usage.

10. Tangible memory media containing a software application program for processing data for transmission over a multicast communications network; wherein said program is arranged to:

define one or more primary data sets for broadcast transmission over at least one primary multicast communications channel in a communications network; each primary data set comprising data relating to a respective set of at least two or more secondary data sets associated therewith and provided for transmission over one or more secondary multicast communications channels;

repeatedly transmit (a) said primary data set or sets over said primary multicast communications channel(s) and (b) said secondary data sets over said secondary multicast communications channels;

modify said primary data sets respectively as required in response to modifications to at least one secondary data set in the respective sets associated therewith; and, repeat the modifying step to provide potential recipient(s) of said primary data sets with an indication that at least one secondary data set has been modified independently of said recipient(s) receiving the modified secondary data set or sets, wherein at least one secondary data set comprises at least a description of a media session to be transmitted over said network.

11. A method of accessing data transmitted over a multicast communications network; said method comprising:

i) receiving at least one primary data set transmitted over a primary multicast communications channel in a communications network, each primary data set comprising data relating to two or more secondary data sets associated therewith, and repeatedly transmitted over one or more secondary multicast communication channels;

ii) processing each primary data set to determine whether said data set or sets indicate changes to any one or more of said secondary data sets; and iii) receiving said secondary data set or sets over said secondary multicast communications channel or channels in response to changes to said secondary data set or sets being determined, wherein at least one secondary data set comprises at least a description of a media session to be transmitted over said network.

12. A method according to claim 11 wherein each data set comprises a data set identifier, a current edition parameter, and a data payload, wherein the data payload of each primary data set comprises the data set identifier and the current edition parameter of each associated secondary data set.

13. A method according to claim 12 wherein said current edition parameter in the primary data set referring to each secondary data set is modified in response to changes to said secondary data set payload data, thereby to provide recipients of the or each primary data set with an indication of the identity of the or each modified secondary data set.

14. A method according to claim 12 wherein each current edition parameter is provided with an initial value and wherein the value of said parameter is incremented in response to the data set payload data being modified.

15. A tangible memory containing a software application program for processing data for transmission over a multicast communications network; wherein said program is arranged to:

receive at least one primary data set transmitted over a primary multicast communications channel in a communications network, each primary data set comprising data relating to two or more secondary data sets associated therewith and repeatedly transmitted over one or more secondary multicast communications channels;

process each primary data set to determine whether said data set or sets indicate changes to any one or more of said secondary data sets; and join each secondary communications channel to receive said secondary data set or sets over said secondary multicast communications channel or channels in response to changes to said secondary data set or sets being determined, wherein at least one secondary data set comprises at least a description of a media session to be transmitted over said network.

* * * * *